US011270299B2

(12) United States Patent
Bankston et al.

(10) Patent No.: US 11,270,299 B2
(45) Date of Patent: Mar. 8, 2022

(54) METHODS AND SYSTEMS OF USING A CRYPTOCURRENCY SYSTEM TO MANAGE PAYMENTS AND PAYMENT ALTERNATIVES

(71) Applicant: Visa International Service Association, San Francisco, CA (US)

(72) Inventors: Michael Bankston, Foster City, CA (US); David White, Oakland, CA (US); Ryan Hagey, Alameda, CA (US); Arturo Martinez, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 1306 days.

(21) Appl. No.: 14/961,554

(22) Filed: Dec. 7, 2015

(65) Prior Publication Data

US 2017/0161734 A1 Jun. 8, 2017

(51) Int. Cl.
*G06Q 20/38* (2012.01)
*G06Q 20/06* (2012.01)
(Continued)

(52) U.S. Cl.
CPC ....... *G06Q 20/3829* (2013.01); *G06Q 20/065* (2013.01); *G06Q 20/387* (2013.01); *G06Q 20/405* (2013.01); *G06Q 30/0226* (2013.01)

(58) Field of Classification Search
CPC ....................................................... H04L 63/00
See application file for complete search history.

(56) References Cited

U.S. PATENT DOCUMENTS

2014/0164251 A1 6/2014 Loh
2014/0330721 A1* 11/2014 Wang ..................... G06Q 20/40
705/44
(Continued)

FOREIGN PATENT DOCUMENTS

CN         104392354 A      3/2015
KR    10-2015-0107971 A     9/2015
WO        2015/175854 A2   11/2015

OTHER PUBLICATIONS

International Search Report / Written, dated Feb. 28, 2017, in PCT Application No. PCT/US2016/060048, 8 pages.
(Continued)

*Primary Examiner* — John W Hayes
*Assistant Examiner* — Zehra Raza
(74) *Attorney, Agent, or Firm* — Kilpatrick Townsend & Stockton LLP

(57) ABSTRACT

Embodiments of the present invention are directed to methods and systems for the efficient management of a digital currency system using a cryptocurrency scheme. Embodiments utilize a payment processor computer to manage entities in the digital currency system, which have the rights to generate, distribute, transact with, and redeem units of a digital currency. In some embodiments, the digital currency may represent points in a loyalty program operated by an entity or organization. Transactions performed using the digital currency and rules governing the digital currency can be tracked and maintained in a master ledger maintained by the payment processor computer, and distributed as sub-ledgers to other entities within the digital currency system.

20 Claims, 8 Drawing Sheets

(51) Int. Cl.
*G06Q 30/02* (2012.01)
*G06Q 20/40* (2012.01)

(56) References Cited

U.S. PATENT DOCUMENTS

| | | | |
|---|---|---|---|
| 2015/0220892 A1 | 8/2015 | Allen | |
| 2015/0262176 A1 | 9/2015 | Langschaedel et al. | |
| 2015/0310424 A1 | 10/2015 | Myers | |
| 2015/0332256 A1 | 11/2015 | Minor | |
| 2015/0332395 A1* | 11/2015 | Walker | G06Q 20/06 705/69 |
| 2015/0348017 A1* | 12/2015 | Allmen | G06Q 20/367 705/76 |
| 2015/0371224 A1 | 12/2015 | Lingappa | |
| 2016/0224977 A1 | 8/2016 | Sabba | |
| 2016/0342988 A1* | 11/2016 | Thomas | G06Q 20/401 |
| 2017/0004488 A1 | 1/2017 | Higgens, Sr. et al. | |
| 2017/0140408 A1* | 5/2017 | Wuehler | G06Q 30/0207 |

OTHER PUBLICATIONS

Nakamoto, "Bitcoin: A Peer to Peer Electronic Cash System," Oct. 31, 2008, pp. 1-9, XP055387899, rerieved from the Internet: URL:http://Nakamotoinstitute.org/static/docs/bitcoin.pdf, retrieved on Jul. 4, 2017.
Wikipedia, "Digital Signature—Wikipedia," Jan. 26, 2014, pp. 1-10, XP055391708, retrieved from the Internet: URL:http://en.wikipedia.org/w/index.php?title=Digital_signature&old id=592423738, retrieved on Jul. 28, 2017.
Supplementary European Search Report, dated Nov. 15, 2018, in EP Application No. 16873533.0, 9 pages.
EP16873533.0 , "Office Action", dated May 18, 2020, 10 pages.
CN Office Action mailed for CN Application No. CN201680071832.X dated Jun. 25, 2021, 21 pages.
First Examination Report received for IN Appl. No. 201847024534, dated Oct. 8, 2021, 5 pages.
"Blockchain", Wikipedia, Available Online at https://en.wikipedia.org/wiki/Blockchain, Nov. 29, 2015, 31 pages.
First Examination Report received for AU Appl. No. 2016369243, dated Nov. 10, 2021, 4 pages.
Summons to Attend Oral Proceedings received for EP Appl. No. 16873533.0 mailed Nov. 11, 2021, 12 pages.

* cited by examiner

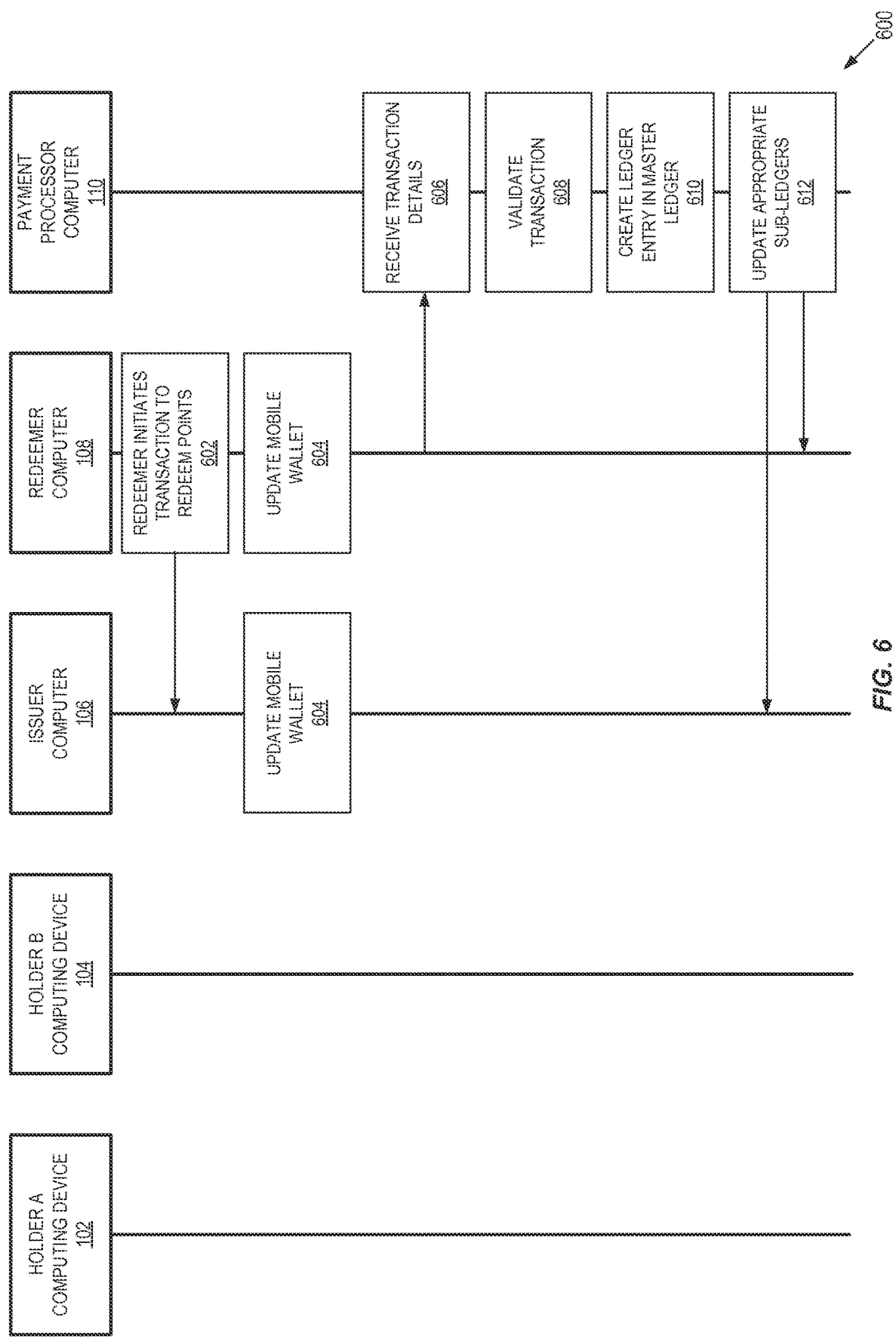

| ISSUER ENROLLMENT LEDGER ENTRY | REDEEMER ENROLLMENT LEDGER ENTRY | HOLDER A ENROLLMENT LEDGER ENTRY | HOLDER B ENROLLMENT LEDGER ENTRY | ISSUER VALUE TOKEN A LEDGER ENTRY | ISSUER RULE A LEDGER ENTRY | ISSUER RULE B LEDGER ENTRY | ISSUER DISTRIBUTION TO HOLDER A LEDGER ENTRY | HOLDER A VALUE TOKEN B LEDGER ENTRY | HOLDER A DISTRIBUTION TO REDEEMER LEDGER ENTRY | REDEEMER VALUE TOKEN B LEDGER ENTRY | REDEEMER REDEMPTION TO ISSUER LEDGER ENTRY |
|---|---|---|---|---|---|---|---|---|---|---|---|
| 110c-1 | 110c-2 | 110c-3 | 110c-4 | 110c-5 | 110c-6 | 110c-7 | 110c-8 | 110c-9 | 110c-10 | 110c-11 | 110c-12 |

MASTER LEDGER 110c

FIG. 7

METHODS AND SYSTEMS OF USING A CRYPTOCURRENCY SYSTEM TO MANAGE PAYMENTS AND PAYMENT ALTERNATIVES

BACKGROUND

The use of computing devices to conduct transactions has increased significantly making it increasingly easy for consumers to conduct electronic commerce and online purchases using merchant websites and mobile applications. This has also led to a shift away from paper-based monetary schemes (e.g., the exchange of physical or paper currency for goods and service) to instead rely upon electronic systems for monetary exchange. With this shift, there has also been an increase in the number of payment alternatives for performing transactions beyond paper-based schemes, including, but not limited to, credit and debit systems, scrip, loyalty/rewards points, and other forms of digital or virtual currency (e.g., Bitcoin).

Incentive programs and loyalty programs are developed and managed by companies and financial institutions as a means to engender consumer loyalty. Incentives can be provided to consumers through the accumulation of points from conducting transactions. For example, the consumer can exchange points for various goods and services offered by the issuer of the loyalty points. As the number of payment alternatives increases, there is an issue that arises with as to how to manage these payment alternatives in an efficient manner.

In current solutions, consumers establish an account with an accounting database (e.g., financial institution) containing points. As the consumer conducts transactions, they earn points, which the consumer can subsequently use for purchases or other incentives. However, in situations where the consumer is part of many different loyalty or rewards programs, the consumer may be required to establish separate accounts for each of the programs. The infrastructure required to handle the proliferation of loyalty programs can result in significant and unnecessary overhead for account management, in addition to friction to consumers due to overtaxed network resources.

Thus, there is a need for new and enhanced methods of managing a digital currency system offering consumers payment alternatives that has greater efficiency than current solutions.

Embodiments of the present invention address these and other problems, individually and collectively.

BRIEF SUMMARY

Embodiments of the present invention relate to systems and methods for the efficient management of a digital currency system using a cryptocurrency scheme. Embodiments utilize a payment processor computer to manage entities in the digital currency system, which have the rights to generate, distribute, transact with, and redeem units of a digital currency. In some embodiments, the digital currency may represent points in a loyalty program operated by an entity or organization. Transactions performed using the digital currency and rules governing the digital currency can be tracked and maintained in a master ledger maintained by the payment processor computer, and distributed as sub-ledgers to other entities within the digital currency system.

One embodiment of the invention is directed to a method comprising, receiving, by a processor computer from a distributor computer, a request message for generating data elements. The request message may be digitally signed using a first key associated with the distributor computer and include a first amount of the data elements to be generated. The method further comprises validating the request message using a second key associated with the distributor computer to determine that the distributor computer is authorized to generate the data elements. The method further comprises generating a first data entry in a master ledger including the first amount of the data elements, and transmitting a first update to a distributor sub-ledger of the distributor computer, the first update including the first data entry. The method further comprises receiving, from the distributor computer, a rules message digitally signed using the first key associated with the distributor computer and including a rule governing the use of the data elements. The method further comprises validating the rules message using the second key associated with the distributor computer. The method further comprises updating, the master ledger to include a second data entry for the rule, and transmitting a second update to the distributor sub-ledger, the second update including the second data entry.

Another embodiment of invention is directed to a server computer comprising: a processor and a computer readable medium coupled to the processor, the computer readable medium comprising code, executable by the processor to implement a method comprising receiving, by a processor computer from a distributor computer, a request message for generating data elements. The request message may be digitally signed using a first key associated with the distributor computer and include a first amount of the data elements to be generated. The method further comprises validating the request message using a second key associated with the distributor computer to determine that the distributor computer is authorized to generate the data elements. The method further comprises generating a first data entry in a master ledger including the first amount of the data elements, and transmitting a first update to a distributor sub-ledger of the distributor computer, the first update including the first data entry. The method further comprises receiving, from the distributor computer, a rules message digitally signed using the first key associated with the distributor computer and including a rule governing the use of the data elements. The method further comprises validating the rules message using the second key associated with the distributor computer. The method further comprises updating, the master ledger to include a second data entry for the rule, and transmitting a second update to the distributor sub-ledger, the second update including the second data entry.

Another embodiment of invention is directed to a method comprising receiving, from a redeemer computer, a request message to perform a redemption of an amount of data elements with a distributor computer. The request message may be digitally signed using a first key associated with the redeemer computer and including an amount of the data elements to be redeemed. The method further comprises validating the request message using a second key associated with the redeemer computer. The method further comprise updating a master ledger to include a data entry, the data entry indicating the redemption of an amount of data elements with the distributor computer, and initiating a settlement process using information for the redeemer computer stored in a profiles database.

Another embodiment of invention is directed to a server computer comprising: a processor and a computer readable medium coupled to the processor, the computer readable medium comprising code, executable by the processor to implement a method comprising receiving, from a redeemer computer, a request message to perform a redemption of an amount of data elements with a distributor computer. The request message may be digitally signed using a first key associated with the redeemer computer and including an amount of the data elements to be redeemed. The method further comprises validating the request message using a second key associated with the redeemer computer. The method further comprise updating a master ledger to include a data entry, the data entry indicating the redemption of an amount of data elements with the distributor computer, and initiating a settlement process using information for the redeemer computer stored in a profiles database.

Although the above described computers and methods relate to processor computers and systems, other embodiments of the invention may be directed to holder computing devices and methods performed by holding computing devices, redeemer computers as well as processes performed by redeemer computers, distributor computers as well as processes performed by distributor computes, and systems or methods including any combination of the above.

These and other embodiments of the invention are described in further detail below with reference to the Drawings and the Detailed Description.

BRIEF DESCRIPTION OF THE DRAWINGS

FIG. 6 shows a flow diagram of a method of a redeemer redeeming digital currency with an issuer of the digital currency according to an embodiment of the present invention.

FIG. 7 shows an exemplary master ledger database according to an embodiment of the present invention.

DETAILED DESCRIPTION

Figure 1:
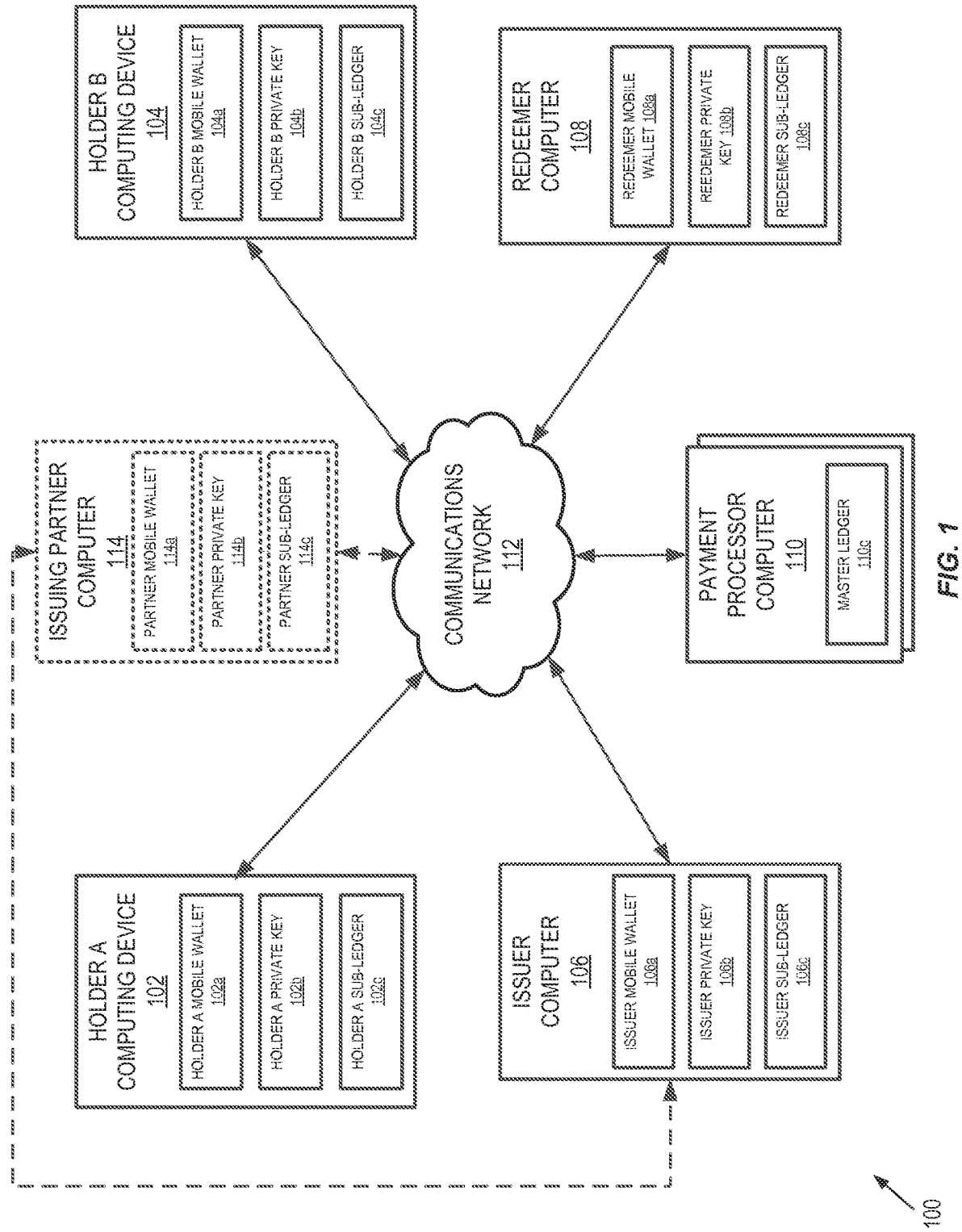
FIG. 1 shows a block diagram of an exemplary system for generating and managing a digital currency system according to an embodiment of the present invention.

Prior to discussing embodiments of the invention, descriptions of some terms may be helpful in providing a better understanding of the invention.

"Digital currency" may include units of value that may be used as a form of payment for transactions, including financial transactions. Digital currency may be currency that is electronically generated by and stored within a user computing device. Digital currency may be represented by data elements (e.g., points, dollars, etc.) having a defined value or conversion rate, and may or may not be a fiat currency. In some embodiments, the defined value and the conversion rate can be modified at any time by the issuer of the digital currency. If the digital currency is a non-fiat currency such as loyalty points, it may also be purchased using conventional forms of currency (e.g., fiat currency) and generated with a specific value. Typically, the digital currency may not have a physical form of tender but may be accessible through a user computing device (e.g., mobile device) using a software application such as a digital wallet or mobile application.

"Data elements" may include a unit of data. In some embodiments, data elements may be the units of data for a digital currency system. The data elements may represent points within the digital currency system, where the number of data elements represents the number of points. In some embodiments, data elements may also be referred to as units, credits, or points.

A "master ledger" may include a compilation of data from previous transactions. The master ledger may be stored in a database and/or in a particular file structure. The master ledger may store data from any suitable number (e.g., all) of previous transactions performed using a digital currency. An entry in the master ledger may include the date and time of a transaction, the transaction amount, and the participants to the transaction (e.g., the sender and the receiver of the transaction amount). In some embodiments, the master ledger may be embodied by a block chain, where each new block in the block chain is algorithmically determined based on new transactions and previous blocks in the block chain. In some embodiments, the master ledger may be stored and managed by a central processing computer (e.g., a payment processor computer).

A "sub-ledger" may include a sub-set of data in a master ledger. The sub-ledger may be stored in a database and/or in a particular file structure. The sub-ledger may store data from a sub-set of data from previous transactions performed using a digital currency. Such data may include the date and time of a transaction, the transaction amount for the transaction, and the participants of the transaction (e.g., the sender and the receiver of the transaction amount). In some embodiments, the sub-ledger may be embodied by a block chain, where each new block in the block chain is algorithmically determined based on new transactions and previous blocks in the block chain. In some embodiments, the sub-ledger may be stored and managed by a central processing computer (e.g., a payment processor computer) in a digital currency system. In some embodiments, other entities within the digital currency system may store sub-ledgers of the master ledger. Each sub-ledger may include entries from the master ledger that are relevant to the particular entity or node associated with that entity. In some embodiments, only particular entities may see the contents of a sub-ledger. For example, a sub-ledger entry for a transaction may only be seen by the participants to the transaction and the payment processor computer that processed the transaction. In some embodiments, one or more nodes may store a read-only copy of the master ledger, such that the master ledger is unalterable by those particular nodes or entities.

A "data entry" may include an entry having information. A data entry may be a recordation of information. In some embodiments, each data entry may include pieces of information evidencing a different event (e.g., a transaction, a rule creation). In some embodiments, the data entry may include information regarding a completed transaction, including a sender address, a recipient address, a transaction amount, etc.

A "digital signature" may include a mathematical technique used to validate the authenticity and integrity of a message. A digital signature may be a unique value generated from the message and a private key using an encryption algorithm. In some embodiments, a public key associated with the private key may be used to verify the signature (as is known in the art). A digital signature may be a numeric value, an alphanumeric value, or any other type of data including a graphical representation.

A "key" may include a piece of information that determines a functional output of a cryptographic algorithm or cipher.

A hash function" may include a function that can map data of an arbitrary size to data of a fixed size.

A "nonce" may include a random or pseudo-random value. In some embodiments, the nonce may be an arbitrary number that may be used only once. A nonce may be used in cryptography as part of generating a hash function. In some embodiments, a nonce may be a 32-bit field. However, in other embodiments, the nonce may be smaller or larger than 32-bits.

A "message" may include an electronic message that may communicate information. An electronic message may be in any suitable form including an e-mail, a short messaging service (SMS) message, a multimedia messaging service (MMS) message, a hypertext transfer protocol (HTTP) request message, an ISO 8583 message, a transmission control protocol (TCP) packet, a web form submission. The message may be directed to any suitable location, such as an e-mail address, a telephone number, an internet protocol (IP) address, or a uniform resource locator (URL). In some embodiments, a message may comprise a mix of different message types, such as both email and SMS messages.

A "profile" may refer to information regarding an entity. In some embodiments, the profile may be a representation of information regarding the entity, including rights and restrictions, identification data, and verification data. For example, a profile for an entity may include data indicating the type of role the entity has within a digital currency system. The profile may also be used to store financial information for a user. In some embodiments, the profile may be stored in a database and be linked to an identifier associated with the entity the profile is related to. An entity may have one or more profiles.

A "value token" may be an identifier representing a value. In some embodiments, a value token may have value associated with it that allows it to be transferred from one entity to another entity. For example, a value token may be transferred from a first entity to a second entity as part of a transaction, such as a points disbursement, transfer in exchange for another value, and a redemption for fiat currency.

A "payment processor computer" may include a server computer used for payment processing. A payment processor computer may comprise one or more computational apparatuses and may use any of a variety of computing structures, arrangements, and compilations for servicing the requests from one or more client computers. In some embodiments, the payment processor computer may operate multiple server computers. In such embodiments, each server computer may be configured to process transaction for a given region or handle transactions of a specific type based on transaction data. In some embodiments, each server computer may be configured to store a copy of a master ledger of transactions.

In some embodiments, a payment processing server computer may be present in a payment processing network. A payment processing network may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing network may use any suitable wired or wireless network, including the Internet.

"Initiating" may include taking steps to start a process or performing at least initial steps in the process itself. For example, "initiating, by the processor computer, a settlement process using financial information for the redeemer computer stored in a profiles database" can refer to the actual process required to complete the action relating to the settlement process. In some embodiments, "initiating, by the processor computer, a settlement process using financial information for the redeemer computer stored in a profiles database" can also include sending a message with instructions for performing a settlement process.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Embodiments of the present invention may be directed to implementing a digital currency system using cryptocurrency payment network techniques. In such embodiments, a payment processor computer may manage the rights and restrictions granted to entities within the digital currency system. Some nodes in the cryptocurrency payment network may be issuers that are granted the right to issue and generate digital currency, while other nodes may be holders or redeemers that are granted the right to distribute and transact using the digital currency. In some embodiments, the redeemer nodes may use the rules governing the digital currency for redemptions of digital currency for a fiat currency.

I. Systems

FIG. 1 shows a block diagram of an exemplary system 100 for generating and managing a digital currency system according to an embodiment of the present invention. The system 100 in FIG. 1 includes a holder A computing device 102, a holder B computing device 104, an issuer computer 106, a redeemer computer 108, and a payment processor computer 110. In the embodiment shown in FIG. 1, the systems and computers are shown to interact via one or more communications networks 112 (e.g., one or more of the Internet, private communication networks, and public communication networks). Each of these systems and computers may be in operative communication with each other via any suitable communication medium (including the Internet), using any suitable communications protocol. In some embodiments, an optional issuing partner computer 114 coupled to the issuer computer 106 may also interact with the systems and computers shown in FIG. 1 via the one or more communications networks 112.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. Thus, in FIG. 1, the inclusion of dotted lines indicates optional features that serve as a reminder that the number of these entities included in various embodiments is flexible.

The holder A and holder B computing devices 102 and 104 may be in any suitable form. For example, suitable computing devices may be hand-held and compact so that they can fit into a user's pocket. Examples of computing devices 102 and 104 may include any device capable of accessing the Internet or other suitable network. Specific examples of computing devices 102 and 104 include cellular or wireless phones (e.g., smartphones), tablet phones, tablet computers, laptop computers, desktop computers, terminal computers, work stations, personal digital assistants (PDAs), physical cryptocurrency wallet hardware, pagers, portable computers, smart cards, wearable devices such as smartwatches, vehicles such as automobiles with remote communication capabilities, and the like. In some embodiments of the invention, a computing device and a corresponding payment device associated with the holder may be embodied by a single device (e.g., a mobile phone that can be used to conduct a payment transactions).

The computing devices 102 and 104 may each include a processor and a computer readable medium coupled to the processor. The computer readable medium may comprise code, executable by the processor for performing the functionality described herein. The computing devices 102 and 104 may transmit data through the communications network 112 to the issuer computer 106, the redeemer computer 108, the payment processor computer 110, and to each other.

In some embodiments, each of the computing devices 102 and 104 may include a mobile wallet (102a and 104a) (or mobile wallet software such as a mobile wallet application), a private key (102b and 104b) (e.g., a private encryption key), and a sub-ledger (102c and 104c).

The holder A mobile wallet 102a associated with the holder A computing device 102 may be a storage application configured to store and maintain data. In some embodiments, the mobile wallet may store data indicating the digital currency acquired from the issuer computer 106 (or another entity within the system 100). The mobile wallet 104a associated with the holder B computing device 104 may also contain the digital currency acquired from the issuer computer 106 (or another entity within the system 100). In some embodiments, the mobile wallet (102a and 104a) can store user profile information, payment information, bank account information, and/or the like. The mobile wallet 102a and 104a can be used in a variety of transactions, such as but not limited to electronic commerce, money transfer/personal payments, mobile commerce, proximity payments, and/or the like for retail purchases, digital goods purchases, and transferring funds between users.

The holder A private key 102b associated with the holder A computing device 102 may be obtained from the payment processor computer 110 as part of an enrollment process in the system 100. The holder A private key 102b may be a numeric or alphanumeric value and may be generated using an algorithm. The holder A private key 102b may be part of a key pair that includes a corresponding holder A public key. In some embodiments, the holder A private key 102b may be used to digitally sign a message, while the holder A public key associated with the holder A private key 102b may be used to validate the digital signature associated with the message. By encrypting the message with holder A private key 102b, the message may be considered to be digitally signed. It can be guaranteed that only an entity or person in possession of holder A private key 102b could have encrypted the message, thereby verifying the encryptor and sender of the message as holder A when the message is decrypted using holder A public key.

Figure 2:
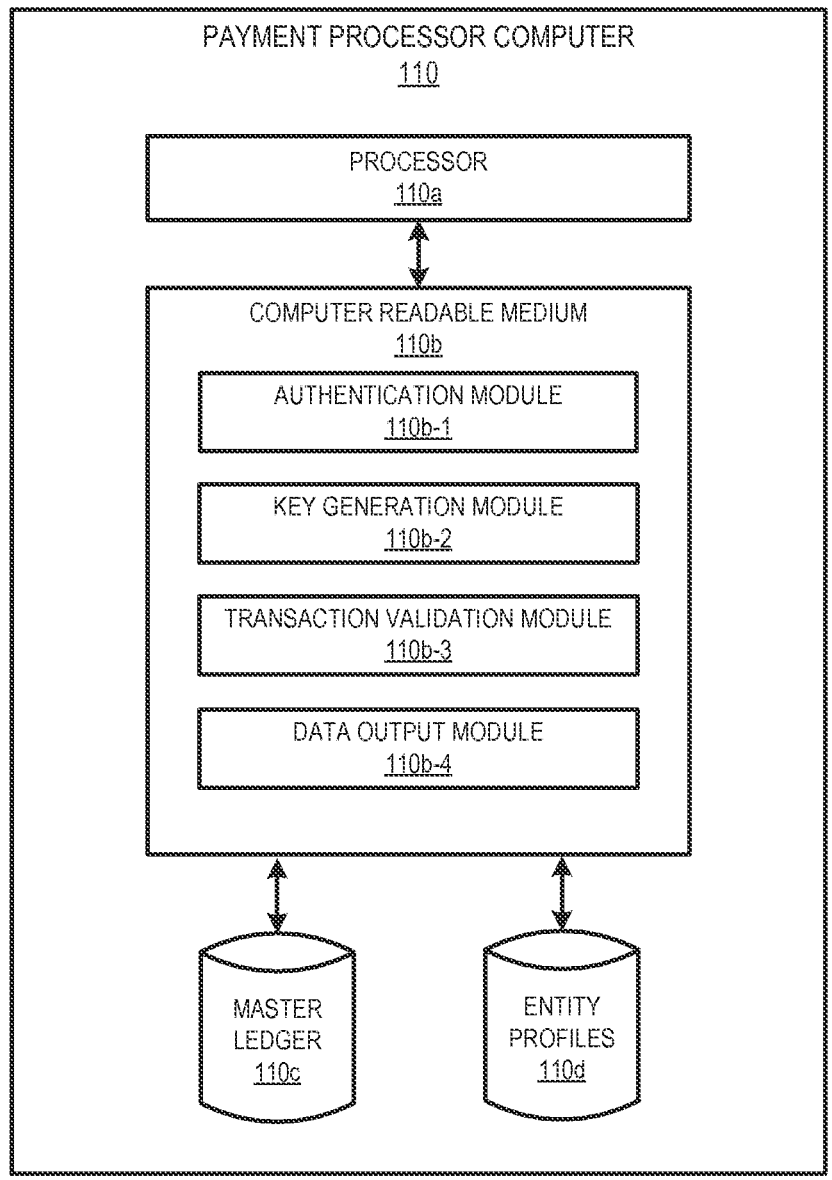
FIG. 2 shows a detailed block diagram for a payment processor computer according to an embodiment of the present invention.

In some embodiments, referring to FIG. 2, upon receiving a request from the holder A computing device 102 for enrollment in the system 100, a key generation module 110b-2 in the payment processor computer 110 may generate a public and private key pair for the holder A computing device 102. A similar operation may be performed upon receiving a request from the holder B computing device 104.

The holder A sub-ledger 102c associated with the holder A computing device 102 may contain a sub-set of the ledger entries contained in the master ledger database 110c stored at the payment processor computer 110. In some embodiments, the sub-set of the ledgers entries contained in the holder A sub-ledger 102c may be those ledgers entries relevant to transactions involving the holder A computing device 102, the digital currency stored in the holder A mobile wallet 102a, as well as any associated rules governing the digital currency stored in the holder A mobile wallet 102a. In such embodiments, the holder A sub-ledger 102c may not include transactions that the holder A computing device 102 was not involved in. In some embodiments, the sub-set of the ledger entries in the holder A sub-ledger 102c may be read-only entries that cannot be altered by the user associated with the holder A computing device 102.

The holder B computing device 104 may include a holder B mobile wallet 104a to store and maintain the digital currency, a holder B private key 104b for encrypting messages, and a holder B sub-ledger 104c for storing records of transactions and rules relevant to the holder B computing device 104. Additional details of the holder B mobile wallet 104a, the holder B private key 104b, and the holder B sub-ledger 104c can be found previously with respect to the holder A computing device 102.

In some embodiments, each of the issuer computer 106 and the redeemer computer 108 may be a computer associated with a separate entity. For example, the issuer computer 106 may be associated with a first entity (e.g., a first merchant), while the redeemer computer 108 may be associated with a second entity (e.g., a second merchant). The issuer computer 106 and the redeemer computer 108 may each include a processor and a computer readable medium coupled to the processor, the computer readable medium comprising code, executable by the processor for performing the functionality described herein.

As noted above, the system 100 may include the issuer computer 106 and the redeemer computer 108 in communication via the communications network 112. In some embodiments, each of the issuer computer 106 and the redeemer computer 108 may be granted the rights and ability to participate in the system 100 by the payment processor computer 110.

The issuer computer 106 may include a processor and a computer readable medium coupled to the processor, the computer readable medium comprising code, executable by the processor for performing the functionality described herein. The issuer computer 106 may be an entity that is capable of generating and distributing digital currency. In some embodiments, the issuer computer may generate more than one digital currency. The digital currency held by the issuer computer 106 may be contained in an issuer mobile wallet 106*a*. In some embodiments, the issuer computer 106 may be a distributor computer.

The redeemer computer 108 may include a processor and a readable medium coupled to the processor, the computer readable medium comprising code, executable by the processor for performing the functionality described herein. The redeemer computer 108 may be an entity that is capable of receiving digital currency and returning the digital currency to the issuer computer 106 in exchange for a fiat currency (or an alternative unit of value). The amount of the fiat currency received by the redeemer computer 108 may be based on the amount of the digital currency returned, previously established conversion rates between the digital currency and the fiat currency and/or based on contractual agreements between the issuer computer 106 and the redeemer computer 108. The digital currency held by the redeemer computer 108 may be contained in an redeemer mobile wallet 108*a*

In some embodiments, the issuer computer 106 and the redeemer computer 108 may each maintain a sub-ledger 106*c* and 108*c* of the transactions performed using the digital currency and rules established for the digital currency in the system 100. In some embodiments, the sub-ledgers 106*c* and 108*c* may include a list of transactions with each entry including a sender address, a receiver address, and an amount of digital currency for each transaction. In some embodiments, each sub-ledger 106*c* and 108*c* may include only entries related to transactions performed by their respective computers. For example, the redeemer sub-ledger 108*c* may store only those entries from the master ledger database 110*c* that relate to transactions involving the redeemer computer 108.

In some embodiments, the issuer sub-ledger 106*c* may include a record of all transactions ever performed using the digital currency issued by the issuer associated with the issuer computer 106, and may be a read-only copy of the master ledger database 110*c* stored in the payment processor computer 110. In such embodiments, the issuer computer 106 may store the read-only copy of the master ledger database 110*c* for audit purposes so as to be aware of all transactions that involved the digital currency generated and distributed by the issuer computer 106.

In some embodiments, storing a sub-ledger may be optional. For example, in some embodiments, only some of the entities in the system 100 may have a sub-ledger. In other embodiments, all or none of the entities in the system 100 may have a sub-ledger. In such embodiments, an entity may request a sub-ledger be generated by the payment processor computer 110 through a subscription process. The payment processor computer 110 may not generate any sub-ledgers unless it receives a request from one of the entities in the system 100, and may only maintain the master ledger database 110*c*.

FIG. 2 shows a detailed block diagram for a payment processor computer 110 according to an embodiment of the present invention. In some embodiments, the payment processor computer 110 may be associated or operated by a payment processing system. The payment processor computer 110 may include a processor 110*a* and a computer readable medium 110*b* coupled to the processor 110*a*, the computer readable medium 110*b* comprising code, executable by the processor 110*a* for performing the functionality described herein.

The computer readable medium 110*b* may comprise code for a plurality of modules, including an authentication module 110*b*-1, a key generation module 110*b*-2, a transaction validation module 110*b*-3, and a data output module 110*b*-4.

The processor 110*a* and the authentication module 110*b*-1 may, in conjunction with each other, be configured to perform authentication processes. The authentication processes may include determining whether a request message received from a computer is from an entity that should be granted the rights of an issuer (capable of generating and distributing digital currency), a redeemer (capable of receiving digital currency and redeeming the digital currency with the issuer for a fiat currency), or a holder (capable of performing transactions with the digital currency). In some embodiments, a first entity may have multiple rights such that it may generate a first digital currency as well as perform transactions using or redeeming a second digital currency generated by a second entity. The rights granted to an entity may be determined based on identification data for the entity in the request message, or otherwise based on a contractual agreement.

In some embodiments, the authentication process may also include authenticating a request message from an entity in the system 100 to determine whether the node is an issuer, a holder or a redeemer. In such embodiments, the processor 110*a* and the authentication module 110*b*-1 may evaluate a received message digitally signed using a first key of a key pair (e.g., a private key of the sender) by decrypting the message using a stored second key of the key pair (e.g., a public key of the sender). By verifying the digital signature of the received message using the second key of the sender to decrypt the message, the processor 110*a* and the authentication module 110*b*-1 may determine the authenticity of the message as being from the holder of the corresponding first key. When the processor 110*a* and the authentication module 110*b*-1 determine that the request message was received from a validated entity within the system, the processor 110*a* and the authentication module 110*b*-1 can determine the role (e.g., issuer, holder, redeemer) corresponding to the entity that sent the request message.

The processor 110*a* and the key generator module 110*b*-2 in the payment processor computer 110 may be configured to generate and distribute digital certificates, including public/private keys, to each of the entities as part of an enrollment process to allow the entities to function in the system 100. In some embodiments, a first key of the key pair (e.g., a public key) may be sent to the entity associated with the key, and a second key of the key pair (e.g., a private key) may be stored in a profile for the entity in an entity profiles database 110*d* at the payment processor computer 110. The key pair may be used to identify the entity as being an issuer, a holder, a redeemer or an issuing partner such that when the entity transmits a request to generate or issue digital currency, the payment processor computer 110 may determine whether the entity is an issuer that is authorized to generate and issue the digital currency, or whether the entity is another type of entity that is not authorized to generate or issue the digital currency. In some embodiments, the key pair may be an asymmetric key pair. It is also possible to use symmetic key pairs in embodiments of the invention. However, in other embodiments, the key pair may be generated using any other appropriate algorithms.

In some embodiments, the key pair may be an asymmetric key pair such that the public key may be used to encrypt a message sent from an entity to the payment processor computer 110, and the corresponding private key for that entity may be used by the payment processor computer 110 to decrypt the message.

The key pair may be generated by the payment processor computer 110 in response to a request message from an entity (e.g., issuer computer 106) to create a digital currency (e.g., points) system and to be designated as an entity with the rights to generate and distribute the digital currency in the system 100.

The processor 110*a* and the transaction validation module 110*b*-3 may be configured to evaluate a transaction message received from entities in the system 100 and determine where the transaction contained in the transaction message are valid. The processor 110*a* and the transaction validation module 110*b*-3 may also be configured to generate a ledger entry in the master ledger database 110*c* (stored in a data store) indicating the approval of the transaction, in response to determining that the transaction is validated. In some embodiments, the processor 110*a* and the transaction validation module 110*b*-3 may also be configured to evaluate transaction messages related to generating digital currency, redeeming digital currency, and establishing rules associated with generated digital currency In some embodiments, the payment processor computer 110 may receive a transaction message from one or more entities involved in the transaction. For example, for a transaction to transfer digital currency (e.g., points) from the issuer mobile wallet 106*a* to the holder A mobile wallet 102*a*, the processor 110*a* and the transaction validation module 110*b*-3 may receive a transaction message indicating the transaction has occurred. The transaction message may be sent by the issuer computer 106 and/or the holder A computing device 102.

The processor 110*a* and the data output module 110*b*-4 may be configured to generate and send messages to the holder computing devices 102 and 104, the issuer computer 106, and the redeemer computer 108. The data output module 150*b*-4 may generate and send response messages to the entities in response to received request messages to generate key pairs and/or request messages indicating that an entity is requesting to generate, distributed, transact with, or redeem an amount of digital currency. In other embodiments, where the request message was for generating a digital currency, the response message generated and sent by the data output module 150*b*-4 may include an indication as to whether the entity that sent the request message is an issuer and authorized to issue and generate the digital currency.

In some embodiments, the payment processor computer 110 may be coupled to a master ledger database 110*c* and entity profiles database 110*d*.

The master ledger database 110*c* may be or contain a distributed ledger that includes entries for all transactions that occur within the system 100 between the various entities. The master ledger database 110*c* may include at least two types of entries: transaction entries and rule entries.

Transaction entries may be records of changes of ownership of digital currency, such as when the issuer associated with the issuer computer 106 issues digital currency to a holder associated with holder A computing device 102, or when the holder associated with holder A computing device 102 transfers an amount of digital currency to a redeemer computer 108 as part of a transaction.

Rule entries may be records indicating rules associated with the use of particular digital currency. Rules that may be stored in rule entries may include rules regulating redemption and/or transference of the digital currency, conversion rates of the digital currency, and starting/ending dates of rules. In some embodiments, the rules may define an expiration data for the data elements, effective dates for the data elements, limited-time values of the data elements, limits on their use (based on geographical location), the conversion or exchange rate, limits on the entity that can use or accept the data elements. In some embodiments, one or more rules may be associated with the data elements.

In some embodiments, each ledger entry in the master ledger database 110*c* may represent a single event (e.g., a transaction, a rule definition) that was performed within the digital currency system. In some embodiments, each ledger entry may be placed in the master ledger database 110*c* in the order the events were received by the payment processor computer 110. Each ledger entry may be appended to the master ledger database 110*c* by cryptographically signing the ledger entry using the new ledger entry and the previous ledger entry in the master ledger database 110*c*.

The entity profiles database 110*d* may store a profile for each entity or node within the system 100. The profile for each entity may include the a copy of the private/public key that was previous sent to the entity. The profile may also include information regarding the entity and the rights and restrictions associated with the entity (e.g., whether the entity is an issuer, a holder and/or a redeemer).

In some embodiments, the profile for each entity may also store financial information associated with the entity (e.g., financial institution name, bank identification number, account number). In such embodiments, the financial information may be used as part of the redemption process between the redeemer computer 108 and the issuer computer 102. For example, when the redeemer computer 108 attempts to redeem the digital currency with the issuer computer 102 for a fiat currency, the financial information may be retrieved and used for conducting the transfer of funds from the issuer computer 106 to the redeemer computer 108.

In some embodiments, the issuing partner computer 114 may be associated with a user or entity that has a contractual relationship with the issuer computer 106 that generates the digital currency. In such embodiments, the issuing partner computer 114 may receive an amount of digital currency from the issuer computer 106 for distribution to other entities in the system 100 on behalf of the issuer computer 106. The issuing partner computer 114 may include a partner mobile wallet 114*a* to store and maintain the digital currency, a partner private key 114*b* for encrypting messages, and a partner sub-ledger 114*c* for storing records of transactions relevant to the issuing partner computer 114. Additional details of the partner mobile wallet 114*a*, the partner private key 114*b*, and the partner sub-ledger 114*c* can be found previously with respect to the holder A computing device 102.

II. Methods

A. Master Ledgers and Sub-Ledgers

Embodiments of the present invention utilize a master ledger database 110*c* stored at a payment processor computer 110 to store and maintain records of all transactions related to a digital currency, in addition to all rules related to the digital currency.

The master ledger database 110*c* may include two types of entries: transaction entries and rule entries. Transaction entries may be records indicating the changes of ownership of digital currency, such as when the issuer associated with the issuer computer 106 issues digital currency to a holder associated with holder A computing device 102, or when the holder associated with holder A computing device 102 transfers an amount of digital currency to a redeemer computer 108 as part of a transaction. In some embodiments, transaction entries for a particular transaction may be private to the entities participating in the particular transaction and to the payment processor computer 110. In some embodiments, a transaction entry may include one or more rules regarding the digital currency when the rules will not change over time.

Rule entries may be records indicating rules associated with the use of particular digital currency that may change over time, such as an exchange rate. Rules that may be stored in rule entries may include rules regulating redemption and/or transference of the digital currency, conversion rates of the digital currency (e.g., conversion rate between the digital currency and a fiat currency), and starting/ending dates applicable to stored rules. Rules may also be used to encapsulate agreements made between entities in the digital currency system.

In some embodiments, when a change to a rule is needed, a new rule entry in the master ledger database 110c may be placed into effect. In such a scenario, the prior rule being replaced becomes locked and will not apply for future transactions.

When a new ledger entry is generated, the new ledger entry may be signed and/or encrypted depending on the parties to the new ledger entry and the purpose of the new ledger entry. Transactions may be signed by the two participants to the transaction, as well as encrypted such that only the two participants can access the transaction details in the body of the ledger entry. Partner agreement rules (e.g., between an issuer and a redeemer) may be signed and encrypted by the issuer and the redeemer. Public rule entries may be signed only by the issuer and are not typically encrypted. Exchange rates related to transactions between a holder and a redeemer may be signed by the redeemer. If the exchange rate rules require approval, the new ledger entry may also be signed by the issuer.

In some embodiments, the master ledger database 110c stored at the payment processor computer 110 may only be updated by the payment processor computer 110. Read only copies of the master ledger database 110c may be distributed as sub-ledgers. For example, the issuer computer 106 may store an issuer sub-ledger 106c that may include all the entries included in the master ledger database 110c. In such embodiments, as originator and liability holder for the digital currency, the issuer computer 106 may need to have knowledge of all aspects of the events (e.g., transactions and rules). In contrast, other entities in the digital currency system (e.g., holders, redeemers) may not require and may not want to maintain as detailed a record as the master ledger database 110c. In such embodiments, the holder computer(s) and the redeemer computer may store a holder sub-ledger(s) (102c and 104c) and a redeemer sub-ledger 108c, respectively. These sub-ledgers may also be read-only copies, but may include fewer ledger entries than in the full master ledger database 110c or issuer sub-ledger 106c. In embodiments of the present invention, each of the sub-ledgers may provide the entity with the data (e.g., ledger entries) that they may need to validate their own activity.

The sub-ledgers may be encrypted such that only the entity in possession of the sub-ledgers and having the private key can decrypt their own sub-ledger. For example, holder A computing device 102 may decrypt the holder A sub-ledger 102c using the holder A private key 102b. All sub-ledgers, except those that are public sub-ledgers may be encrypted such that only the entity associated with a particular sub-ledger may access the particular sub-ledger.

In some embodiments, when a transaction has been validated by the payment processor computer 110, and a new ledger entry added to the master ledger database 110c, the payment processor computer 110 may replicate the new ledger entry from the master ledger database 110c to generate an entry that can be distributed to the sub-ledgers. The payment processor computer 110 may then generate a hash using the new ledger entry in the master ledger database 110c and a nonce (i.e., a 32-bit field having a random or pseudo-random value). As the entity that replicated the new ledger entry, the payment processor computer 110 may then digitally sign the replicated ledger entry. The signed replicated ledger may then be distributed to the sub-ledgers for the entities involved in the transaction either via a publish/subscribe mechanism, or manually by the entities.

B. Establishment and Enrollment in a Digital Currency System

Figure 3:
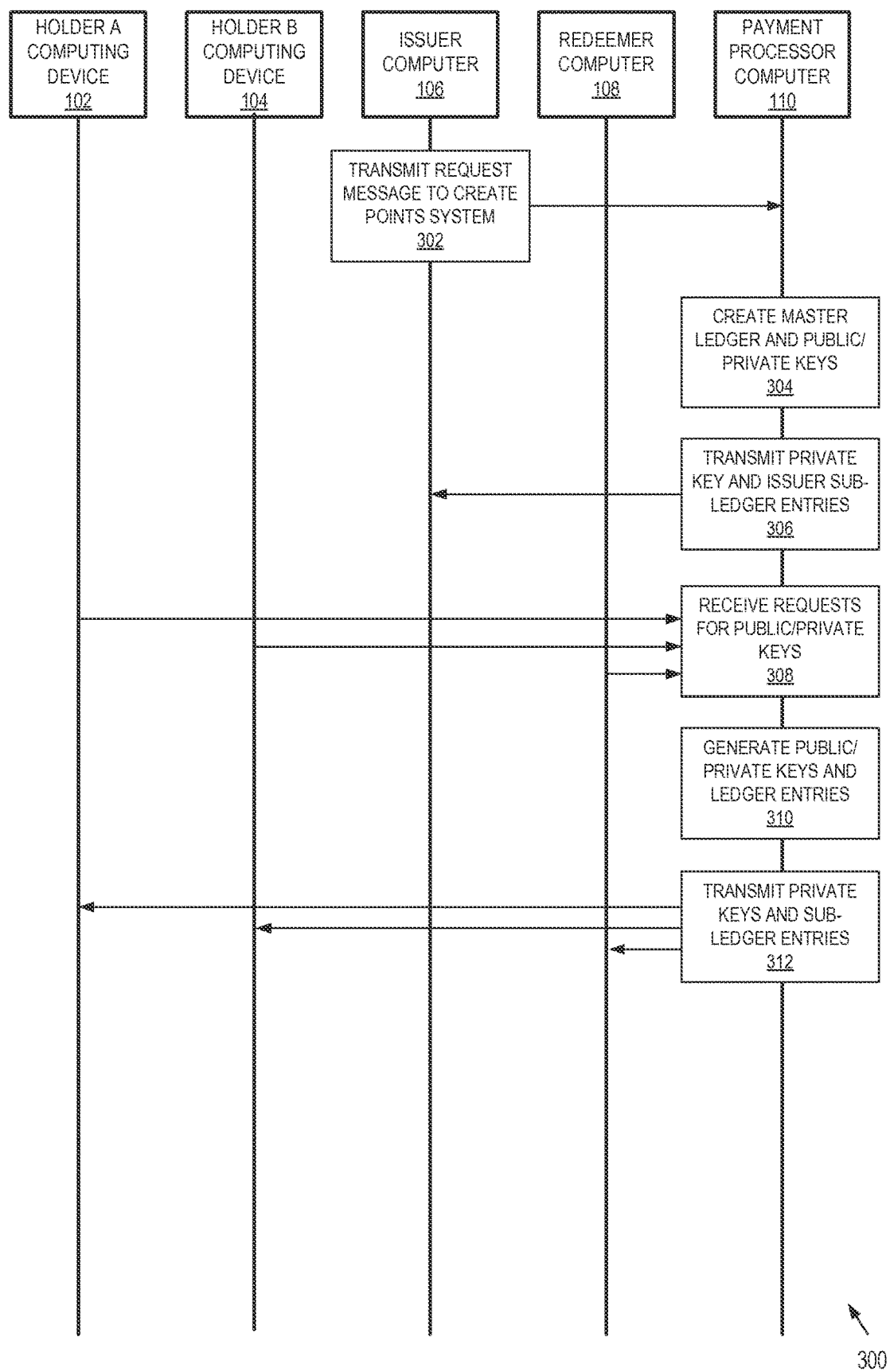
FIG. 3 shows a flow diagram of a method of enrollment and key generation within a digital currency program according to an embodiment of the present invention.

FIG. 3 shows a flow diagram of a method of enrollment and key generation within a digital currency program according to an embodiment of the present invention. Although two holder computing devices (102 and 104), a single issuer computer 106, and a single redeemer computer 108 are depicted in FIG. 3 (the same applies to other subsequently depicted flow diagrams), in other embodiments there may be a fewer number or a greater number of such components.

In step 302, the issuer computer 106 transmits a request message to a payment processor computer 110 to create a digital currency system. The request message may be sent to the payment processor computer 110 across a communications network 112 using an appropriate communications channel and communications protocol. In some embodiments, when the request message is received by the payment processor computer 110, the payment processor computer 110 may determine the identity of the issuer computer 106 that sent the request message.

In some embodiments, the issuer computer 106 may be associated with an entity, such as a merchant or a financial institution, that is requesting the creation of a digital currency program using data elements (e.g., points) with which a value is associated. The value associated with the data elements may be defined by one or more rules created by the issuer computer 106. The request message from the issuer computer 106 may also include a request to be designated as an issuer within the digital currency system. In such embodiments, the payment processor computer 110 may evaluate a merchant identifier (e.g., merchant identification number, merchant name) or bank identification number (BIN) associated with the request message to determine whether the issuer computer 106 should be designated as an issuer.

In step 304, the payment processor computer 110 may create a master ledger database 110c associated with the digital currency system and generate public/private key pair for the issuer computer 106. When the payment processor computer 110 determines that the issuer computer 106 is a valid issuer, the payment processor computer 110 may initiate the process of establishing the digital currency system for the issuer computer 106.

Once the payment processor computer 110 has determined that the issuer computer 106 can be designated as an issuer for the digital currency system, the payment processor computer 110 may generate a unique digital certificate and a key pair for the issuer computer 106. In some embodiments, the first key and the second key may be generated using an asymmetric key pair algorithm. However, the first key and the second key may also be generated using other means, as one of ordinary skill in the art would understand.

In some embodiments, the keys of the key pair may be a numeric or alphanumeric value. In some embodiments, the first key and the second key may be associated with a profile of the issuer computer 106 stored in an entity profiles database 110d.

In some embodiments, the key pair may be functionally akin to a conventional public and private key pair, with the first key being equivalent to a public key. However, in some embodiments, the first key may differ from a typical public key in that the first key may not be publicly disclosed or broadcast to any other entity or computer other than the entity associated with the key pair. In such embodiments, the first key may be encrypted prior to being sent to the issuer computer 106 via the communications network 112 to ensure that if the first key is intercepted, it cannot be used unless the interceptor has the appropriate decryption key. The first key may be used by the issuer computer 106 to verify to the payment processor computer 110 that the issuer computer 106 is an issuer and thus has the right to generate and distribute digital currency. In some embodiments, there may be a plurality of issuer computers that may operate as issuers, each associated with different digital currencies. In such embodiments, the process described above may be repeated for each such additional issuer computer.

The payment processor computer 110 may also generate the master ledger database 110c for the digital currency system. In some embodiments, there may be a single master ledger database 110c for the digital currency system.

In other embodiments, there may be multiple couples of the master ledger database 110c stored by the payment processor computer 110. In such embodiments, each copy of the master ledger database 110c stored by the payment processor computer 110 may be stored on different server computers.

In some embodiments, the payment processor computer 110 may generate a ledger entry 110c-1 (as shown in FIG. 7) indicating the enrollment of the issuer computer 106 in the digital currency system. In some embodiments, the ledger entry 110c-1 for the enrollment of the issuer computer 106 may be an indication that the issuer computer 106 has the liability for the digital currency system. In some embodiments, the ledger entry 110c-1 may be entered as the first data entry in the master ledger database 110c. In some embodiments, this ledger entry 110c-1 may be similar to a public rule and digitally signed using the private key of the issuer computer 110c. In this manner, the ledger entry 110c-1 can be verified using the public key of the issuer computer 110c. In some embodiments, the ledger entry 110c-1 may also be signed by the payment processor computer 110 to indicate that the ledger entry 110c-1 has been processed and validated by the payment processor computer 110.

In step 306, the payment processor computer 110 may transmit the key pair (e.g., the public key and the private key) and an issuer sub-ledger 106c to the issuer computer 106. In some embodiments, the issuer sub-ledger 106c may be a read-only copy of the master ledger database 110c stored at the payment processor computer 110. In such embodiments, the payment processor computer 110 may send all entries to the master ledger database 110c to the issuer computer 106. In other embodiments, the issuer sub-ledger 106c may include a sub-set of the entries in the master ledger database 110c. For example, in some embodiments, once the issuer computer 106 has distributed the digital currency, the issuer sub-ledger 106c may include only ledger entries related to rules governing the digital currency. For example, this may include rules specifying how redemption of the digital currency by the redeemer computer 108 with the issuer computer 110 is conducted.

In some embodiments, instead of sending entries from the master ledger database 110c to the issuer computer 106, the payment processor computer 110 may provide information to the issuer computer 106 to allow an application running the issuer sub-ledger 106c to subscribe to receive messages from the payment processor computer 110 containing updates to the issuer sub-ledger 106c when modifications are made to the master ledger database 110c. In such embodiments, changes to the master ledger database 110c may be pushed out to the issuer sub-ledger 106c.

In some embodiments, after generating a first data entry in a master ledger database 110c indicating the enrollment of the issuer computer 106, the payment processor computer 110 may transmit a first update to the issuer sub-ledger 106c, the first update including the first data entry. In some embodiments, the payment processor computer 110 may replicate the first data entry from the master ledger database 110c. The payment processor computer 110 may then generate a hash using the first data entry in the master ledger database 110c and a nonce to generate the first update. The payment processor computer 110 may then digitally sign the first update prior to transmitting the first update to the issuer computer 106.

In some embodiments, the issuer sub-ledger 106c may be created any time subsequent to the payment processor computer 110 generating the private and public key for the issuer computer 106 and prior to any transaction. For example, the issuer sub-ledger 106c may not be created until an initial transaction is performed by the issuer computer 106, such as a points generation process. The same may also apply to the other entities in the system 100 (e.g., the holder A sub-ledger 102c may not be created until a transaction where holder A is issued points by the issuer computer 106).

In step 308, the payment processor computer 110 may receive request messages requesting public/private keys be generated for additional entities for enrollment in the digital currency system. The request message may be sent to the payment processor computer 110 across a communications network 112 using an appropriate communications channel and communications protocol. In some embodiments, when the request message is received by the payment processor computer 110, the payment processor computer 110 may determine the identity of the requestors that sent the request messages. For example, the payment processor computer 110 may receive requests from a holder A computing device 102, a holder B computing device 104, and a redeemer computer 108. The requests from the entities may indicate the type of role each entity is requesting within the digital currency system. For example, the request from the holder A computing device may request to be a holder within the digital currency system.

In some embodiments, the requests from the holder A computing device 102, the holder B computing device 104, and the redeemer computer 108 may include an indicator that the entities are requesting to enroll in the program created by the issuer computer 106. For example, the request may include an identifier associated with the issuer computer 106 or for the system (e.g., an identifier to the master ledger database 110c for a particular program). In such embodiments, the issuer computer 106 may only distribute the identifier to entities that it authorizes to enroll in its program.

In step 310, the payment processor computer 110 may generate a unique public/private key pair for each of the holder A computing device 102, the holder B computing device 104, and the redeemer computer 108. The payment processor computer 110 may also generate ledger entries for each of the enrollments into the digital currency system. This process may be performed in a manner similar to as described above with respect to the issuer computer 106. In some embodiments, the payment processor computer 110 may generate the key pairs for the other entities based on the request received in step 308.

In some embodiments, the payment processor computer 110 may generate ledger entries (as shown in FIG. 7) indicating the enrollment of the holder A computing device 102 (ledger entry 110c-2), the holder B computing device 104 (ledger entry 110c-3), and the redeemer computer 108 (ledger entry 110c-4) in the digital currency system. In some embodiments, the ledgers entries (110c-2, 110c-3, and 110c-4) may be signed using the private key of the issuer computer 106 and the private key of the corresponding entity (e.g., the ledger entry 110c-2 is signed using the private keys associated with the issuer computer 106 and the holder A computing device 102). In some embodiments, the ledger entry 110c-2 may also be signed by the payment processor computer 110 to indicate that the ledger entry 110c-2 has been processed by the payment processor computer 110.

In some embodiments, the ledger entries indicating the enrollment of the entities may be appended to the master ledger database 110c using a hashing technique. For example, when a new ledger entry is to be appended to the master ledger database 110c, a hash of the previous ledger entry (e.g., ledger entry 110c-1) and optionally all other prior ledger entries may be combined with a hash of the new ledger entry (e.g., ledger entry 110c-2). In such embodiments, using the hash of the previous ledger entry allows the system to maintain a sequence of ledger entries that can prevent tampering with previous entries.

In step 312, the payment processor computer 110 may transmit the generated private keys to the corresponding holder A computing device 102, holder B computing device 104, and redeemer computer 108. The payment processor computer 110 may also transmit the appropriate sub-ledger entries to each of the holder A computing device 102, the holder B computing device 104, and the redeemer computer 108. In some embodiments, the sub-ledger entries sent to each of the holder A computing device 102, the holder B computing device 104, and the redeemer computer 108 may be different. In such embodiments, each entity may only receive ledger entries from the master ledger database 110c that are related to the entity. For example, the holder A sub-ledger 102A may only include ledger entries for transactions in which the holder A computing device 102 is a participant, as well as rules that are applicable to the digital currency contained in the holder A mobile wallet 102a.

In some embodiments, instead of sending entries from the master ledger database 110c to the holder A computing device 102, the holder B computing device 104, and the redeemer computer 108, the payment processor computer 110 may provide information to the entities to allow an application running their respective sub-ledgers (102c, 104c, and 108c) to subscribe to receive messages from the payment processor computer 110 containing updates to their respective sub-ledgers when modifications are made to the master ledger database 110c. In such embodiments, the first update and the second update may be automatically transmitted to the issuer sub-ledger 108 based on a predetermined schedule.

Once the issuer computer 106, the holder A computing device 102, the holder B computing device 104, and the redeemer computer 108 have been established, the digital currency system may be configured for operation. In some embodiments, additional entities may be added or removed from the digital currency system at any time, and any of these above-described steps may again be performed by the payment processor computer 110.

C. Generating Digital Currency

Figure 4:
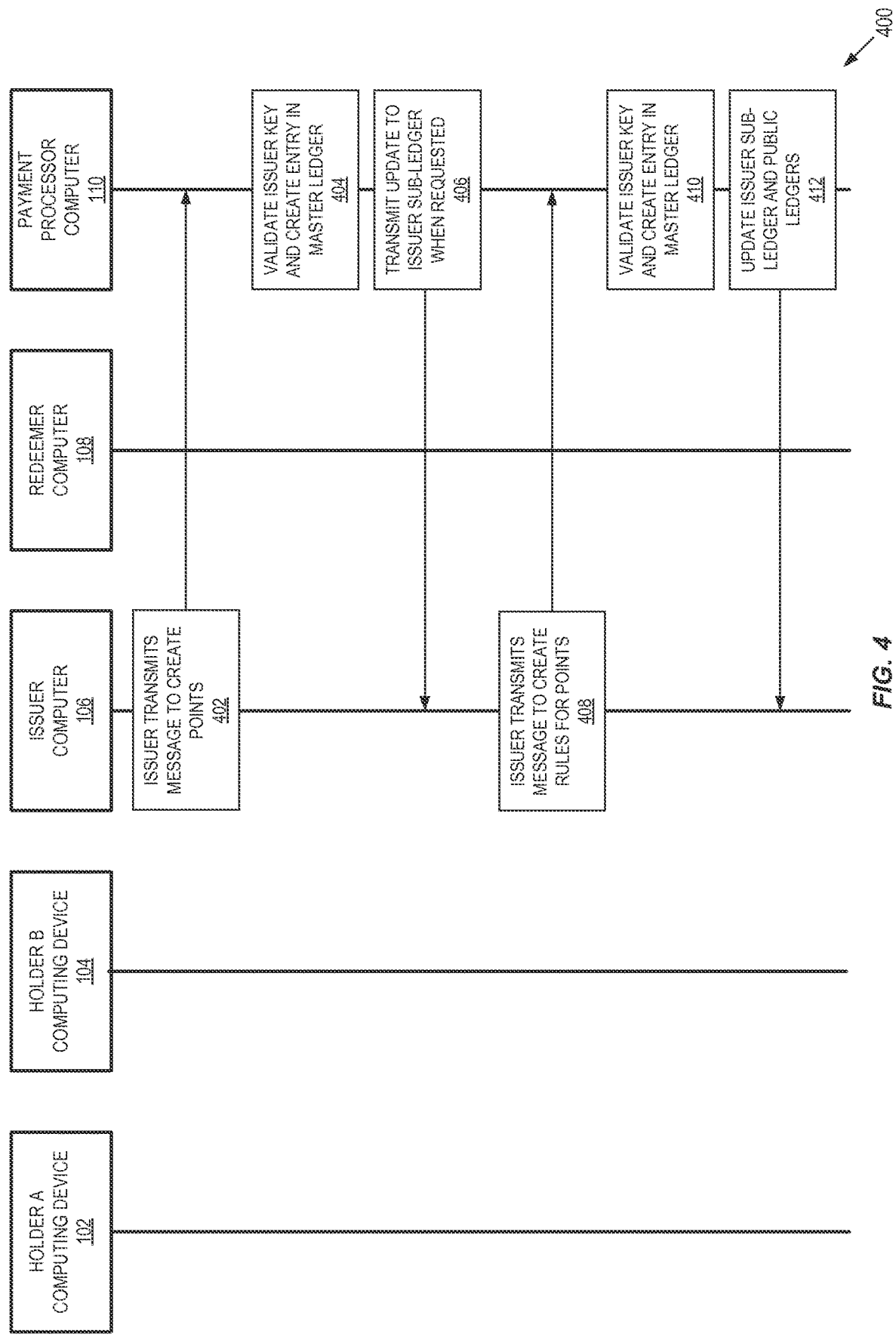
FIG. 4 shows a flow diagram of a method of generating digital currency by an issuer according to an embodiment of the present invention.

FIG. 4 shows a flow diagram 400 of a method of generating digital currency by an issuer according to an embodiment of the present invention.

In step 402, the issuer computer 106 may transmit a request message to create data elements (e.g., points) for the digital currency system, and the payment processor computer 110 may subsequently receive the request message via a communications network 112. In some embodiments, the request message may also include a first amount of the data elements to be generated. The request message itself may also be encrypted by the issuer computer 106 prior to being sent to the payment processor computer 110.

In some embodiments, the request message may be digitally signed using a private key associated with the issuer computer 106 previously generated by the payment processor computer 110. In such embodiments, the issuer computer 106 may use a hash algorithm with the request message to generate a hash value. The issuer computer private key 106b is used with an encryption algorithm to generate a digital signature.

In some embodiments, the issuer computer 106 may perform the steps to generate and issue the data elements. In some embodiments, this process may occur algorithmically (e.g., according to a schedule, according to market conditions, according to a value of an associated fiat currency) or at the request of a user controlling the issuer computer 106.

In some embodiments, prior to sending the request message to the payment processor computer 110, the issuer computer 106 may have signed a transaction to itself for the first amount of the data elements, and subsequently deposited the first amount of the data elements in the issuer mobile wallet 106a. For example, Merchant A associated with the issuer computer 106 may have deposited 100,000 points into the issuer mobile wallet 106a.

The issuer computer 106 may generate the data elements in a variety of ways, including but not limited to sending the amount of data elements to itself as part of a payment transaction message. For example, the issuer computer 106 may generate a first payment transaction message with the source and destination address, which may be the address of the issuer computer 106. The first payment transaction message may include an amount of data elements (e.g., 100,000 points).

In step 404, the payment processor computer 110 may validate that the issuer was in possession of the issuer private key 106b and create an entry in the master ledger database 110c representing the transaction generating the data elements. In such embodiments, the payment processor computer 110 may validate the private key used to sign the request message by using the corresponding public key of the issuer computer 106. In some embodiments, the payment processor computer 110 may validate the digital signature by verifying the received digital signature using the issuer public key to generate a first hash value. The payment processor computer 110 may then use the same hash algorithm used by the issuer computer 106 on the request message to generate a second hash value. When the first hash value and the second hash value match, the digital signature is validated.

When the request message is validated, the payment processor computer 110 will know that the request message was sent by a legitimate issuer of the digital currency system.

In some embodiments, after receiving the request message from the issuer computer 106, the payment processor computer 110 may determine whether the issuer computer 106 is authorized to generate and issue digital currency. In some embodiments, the payment processor computer 110 may retrieve a profile associated with the issuer computer 106 from the entity profiles database 110*d* using identifying information associated with the issuer computer 106. In some embodiments, the payment processor computer 110 may retrieve a second key (e.g., a public key) of the key pair from the retrieved profile for the issuer computer 106. The processor and an authentication module 110*b*-1 may determine the request message was received from an authorized issuer computer 106 by determining whether the request message was digitally signed using a first key that can be decrypted using a second key associated with the authorized issuer computer 106. In some embodiments, the request message may be encrypted by the issuer private key 106*b* (e.g., the first key) prior to being sent by the issuer computer 106. The determination as to whether the request message was made by an authorized issuer node may be made by using an issuer public key (e.g., the second key) stored at the payment processor computer 110 to verify that the request message was digitally signed by the legitimate issuer computer 106.

In some embodiments, the payment processor computer 110 may also generate a ledger entry 110*c*-5 (as shown in FIG. 7) indicating the generation and issuance of a value token A. In some embodiments, the generated ledger entry will include the hash that was digitally signed using the issuer private key 106*b* of the issuer computer 106 and then be digitally signed using a private key of the payment processor computer 110. In such embodiments, this may be an indication that the generated ledger entry is a legitimate entry for a legitimate transaction.

In some embodiments, once the payment processor computer 110 has generated the ledger entry, the payment processor computer 110 may generate and send a response message to the issuer computer 106 indicating this. In some embodiments, the response message may be the sub-ledger update sent to the issuer computer 106 by the payment processor computer 110, as described below.

Assuming the issuer computer 106 has been authorized to issue the digital currency, when the issuer computer 106 receives the response message from the payment processor computer 110 indicating that the issuer computer 106 is authorized to generate and issue digital currency, the issuer computer 106 may then generate the digital currency. In some embodiments, the issuer computer 106 may generate and issue digital currency by establishing an amount of digital currency to create and a currency conversion rate between a unit of the digital currency and a fiat currency (e.g., the U.S. Dollar, the British Pound). For example, one unit of the digital currency may be the equivalent to one U.S. Dollar.

In some embodiments, value token A may be stored in the issuer mobile wallet 106*a* representing the amount of digital currency created by the issuer computer 106. In such embodiments, the ledger entry 110*c*-5 may include data indicating that value token A is stored in the issuer mobile wallet 106*a*.

In step 406, the payment processor computer 110 may transmit an update to the issuer sub-ledger 106*c* including the entry to the master ledger database 110*c*. In some embodiments, the update to the issuer sub-ledger 106*c* is sent based on preferences associated with the issuer computer 106 and/or when requested by the issuer computer 106. In other embodiments, the update to the issuer sub-ledger 106*c* may be sent as part of a subscription process where the updates are sent a pre-established time or interval.

In some embodiments, the update to the issuer sub-ledger 106*c* may be encrypted by the payment processor computer 110 prior to being sent to the issuer computer 106. In such embodiments, the update to the issuer sub-ledger 106*c* may be encrypted using an issuer public key of the issuer computer 106, such that the update to the issuer sub-ledger 106*c* can only be decrypted using the corresponding issuer private key 106*b*.

In step 408, the issuer computer 106 transmits a rules message to the payment processor computer 110 to create rules for the points previously generated. In some embodiments, the rules message may be digitally signed using a private key associated with the issuer computer 106 previously generated by the payment processor computer 110. In some embodiments, the rules message may also include a first amount of the data elements to be generated. The rules message itself may also be encrypted by the issuer computer 106 prior to being sent to the payment processor computer 110. The rules message may include one or more rules governing the use of the points previously generated by the issuer computer 106. In some embodiments, the data elements are points having a value defined by the rule. In some embodiments, the rule may further indicate an exchange rate between the value of the data elements and a fiat currency (e.g., 10 points=$1.00).

In some embodiments, the issuer computer 106 may generate the rules message after generating the points. In other embodiments, the issuer computer 106 may transmit the rules message to the payment processor computer 110 prior to generating the points.

In step 410, the payment processor computer 110 may validate the issuer private key and create an entry in the master ledger database 110*c* representing the rules applicable to the generated data elements. In such embodiments, the payment processor computer 110 may validate the private key used to sign the request message by using the corresponding public key of the issuer computer 106. When the request message is validated, the payment processor computer 110 will know that the request message was sent by a legitimate issuer of the digital currency system.

In some embodiments, the payment processor computer 110 may generate one or more ledger entries 110*c*-6 and 110*c*-7 (as shown in FIG. 7) indicating the rules associated with the generated data elements. In some embodiments, the ledger entries 110*c*-6 and 110*c*-7 generated based on the rules message may be public entries that can be viewed by both participants and non-participants to the digital currency system. For example, the issuer computer 106 may have a default conversion rate between the value of one unit of the data elements and U.S. Dollars, and this rule would be applicable to all entities in the system.

The rules in the ledger entries 110*c*-6 and 110*c*-7 may be added to the master ledger database 110*c* to be used with future transactions that match criteria associated with the digital currency.

In some embodiments, the generated ledger entry for the rules will include the hash that was digitally signed using the issuer private key 106*b* of the issuer computer 106 and then be digitally signed using a private key of the payment processor computer 110. In such embodiments, this may be an indication that the generated ledger entry is a legitimate entry for a legitimate rule created by the issuer computer 106.

In step 412, the payment processor computer 110 may transmit an update to the issuer sub-ledger 106c including the rules entry (110c-6 and 110c-7) to the master ledger database 110c. In some embodiments, the update to the issuer sub-ledger 106c may be sent based on preferences associated with the issuer computer 106 and/or when requested by the issuer computer 106. In some embodiments, the rules entries may be distributed to appropriate sub-ledgers, including one or more public sub-ledgers. Public sub-ledgers may contain all the rule entries that are publicly available, and may be accessible non-participants in the digital currency system, as well as to participants. In some embodiments, the update the issuer sub-ledger 106c (e.g., the second data entry) may be signed using the private key of the issuer computer 106 prior to being appended to the issuer sub-ledger 106c.

In some embodiments, the issuer sub-ledger 106c and the redeemer sub-ledger 108c may include entries from the master ledger database 110c related to rules and/or agreements between the issuer computer 106 and the redeemer computer 108. For example, there may be a rule governing the conversion rate for digital currency that only applies to redeemer computer 108 that may be different from the default conversion rate. The ledger entry for this rule would be included in the issuer sub-ledger 106c and the redeemer sub-ledger 108c, and may be excluded from the sub-ledgers of other entities in the system. In some embodiments, the ledger entries representing rules agreed to by the issuer computer 106 and the redeemer computer 108 may be digitally signed using both the issuer private key 106c and the redeemer private key 108c.

In some embodiments, the issuer computer 106 may update rules that have been previously added to the master ledger database 110c. In such embodiments, the issuer computer 106 may generate an update rules message. The update rules message may be digitally signed using the private key of the issuer computer 106 and may include information related to a modification to a rule. For example, the issuer computer 106 may modify the exchange rate between the value of the data elements (e.g., digital currency) and a fiat currency from 10 points=$1.00 to 12 points=$1.00. In such embodiments, the issuer computer 106 may send the update rules message to the payment processor computer 110. The payment processor computer 110 may validate the update rules message using the public key associated with the first entity computer and corresponding to the private key. When the update rules message is validated, the payment processor computer 110 may update the master ledger database 110c to include a new rules entry including the modification to the rule. The payment processor computer 110 may then transmit the new rules entry to the issuer sub-ledger 106c, and to any other appropriate sub-ledgers, including one or more public sub-ledgers.

D. Distributing and Transacting With Digital Currency

Figure 5:
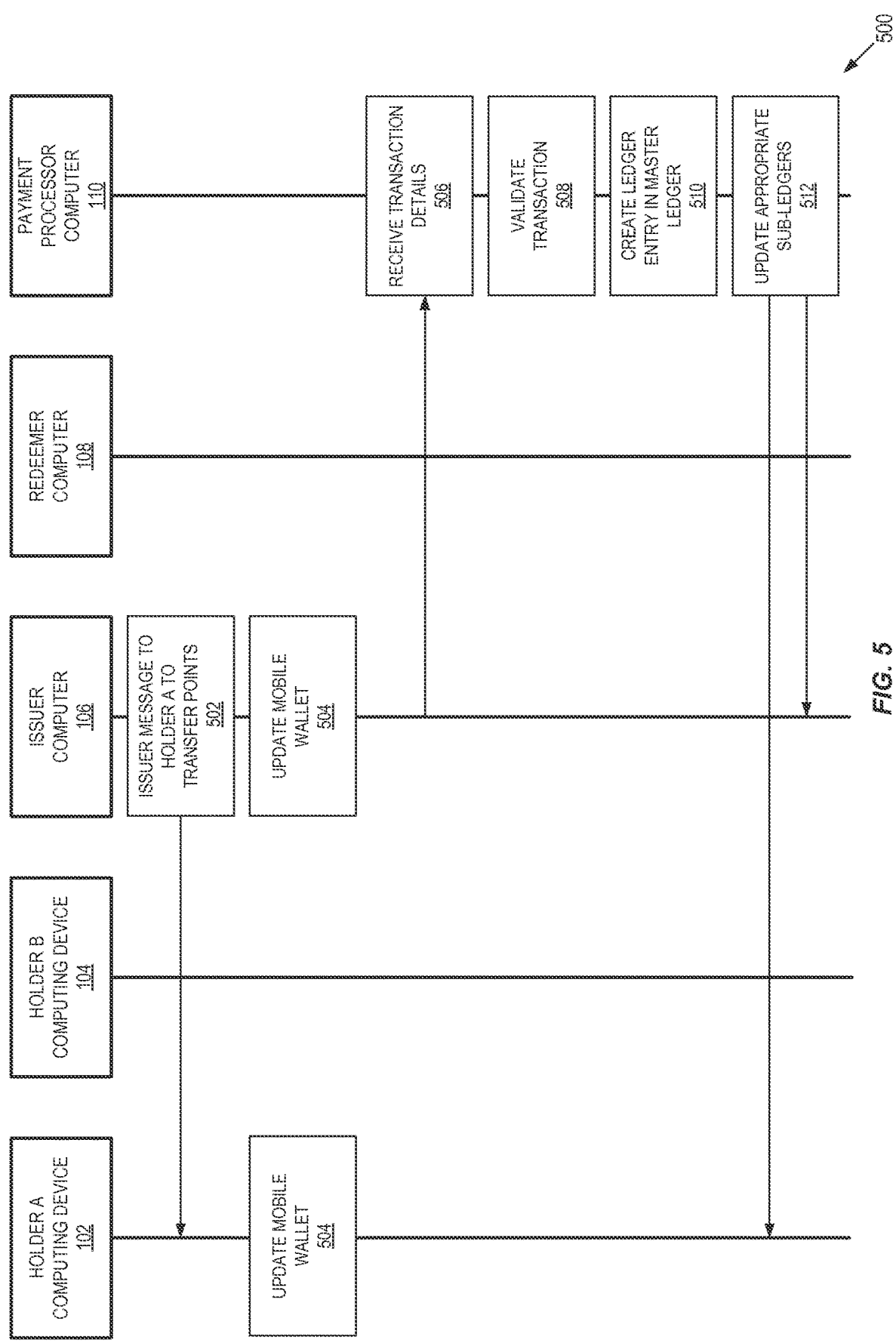
FIG. 5 shows a flow diagram of a method of transferring digital currency between entities according to an embodiment of the present invention.

FIG. 5 shows a flow diagram 500 of a method of transferring digital currency from an issuer of the digital currency to a holder according to an embodiment of the present invention. In some embodiments, the issuer may transfer digital currency to issue digital currency to the holder in response to a transaction performed by the holder. For example, where the issuer is an airline, the issuer may transfer digital currency to the holder for a completed trip using the airline. In another example, the issuer may transfer digital currency for transactions performed by the holder using a linked financial account.

In step 502, the issuer computer 106 may transmit a transaction message to the Holder A computing device 102 to transfer data elements (e.g., points) within the digital currency system from the issuer mobile wallet 106a to the holder A mobile wallet 102a. In some embodiments, the issuer computer 106 may generate a transaction message with the source address being an address of the issuer computer 106, and destination address of the being the address of the Holder A computing device 102. In some embodiments, the issuer computer 106 may request the address of the Holder A computing device 102 from the payment processor computer 110. In such embodiments, the payment processor computer 110 may store the address of the Holder A computing device 102 from the entity profiles database 110d. In such embodiments, the entity profiles database 110d may function as a directory of entities in the system 100. In some embodiments, the issuer computer 106 may then store the address of the Holder A computing device 102 for future transactions.

Subsequent to generating the data elements (see FIG. 4), the issuer computer 106 may create a transaction to transfer an amount of the data elements to one of the holders (e.g., holder A computing device 102). For example, assuming the issuer computer 106 previously generated 100,000 units of the digital currency, the issuer computer 106 may want to transfer 500 units of the digital currency to the holder A computing device 102. In order to distribute the 500 units of the digital currency to holder A computing device 102, the issuer computer 106 may generate a second transaction message including the address of the issuer computer 106, the address of the holder A computing device 102, and the amount of the digital currency (e.g., 500 units). The transaction message may be encrypted by the issuer computer 106 using a public key associated with the holder A computing device 102. This allows the transaction message to be decrypted by the holder A private key 102b. The transaction message may also be digitally signed using the private key of the issuer computer 106. This allows the transaction message to be validated using the public key of the issuer computer 106 to determine that the transaction is valid and from the authentic issuer computer 106. The transaction message may then be sent to the holder A computing device 102.

In step 504, the holder A computing device 102 and the issuer computer 106 may update their respective mobile wallets (102a and 106a). In some embodiments, the holder A mobile wallet 102a may be updated to include the 500 units of digital currency from the issuer computer 106, and the issuer mobile wallet 106a may be updated to decrease the digital currency by the 500 units. In some embodiments, updating the holder A mobile wallet 102a may also include assigning a value token (e.g., value token A) from the issuer mobile wallet 106a to the holder A mobile wallet 102a.

In step 506, the payment processor computer 110 may receive a transaction message including details for the transfer or distribution of data elements (e.g., points) from the issuer computer 106 to the holder A computing device. The transaction message may be received by the payment processor computer 110 via the communications network 112. In some embodiments, the payment processor computer 110 may receive the transaction message after the holder A mobile wallet 102a and the issuer mobile wallet 106a has been updated. In other embodiments, the payment processor computer 110 may receive the transaction message prior to the holder A mobile wallet 102a and the issuer mobile wallet 106a being updated.

In step 508, the payment processor computer 110 may validate the transaction received in the transaction message. In such embodiments, the payment processor computer 110 may validate the private key of the issuer computer 106 used to sign the transaction message by using the corresponding public key of the issuer computer 106. When the request message is validated, the payment processor computer 110 will know that the request message was sent by a legitimate issuer of the digital currency system.

In step 510, the payment processor computer 110 may create a ledger entry in the master ledger database 110c for the transaction received in the transaction message. In some embodiments, the payment processor computer 110 may generate ledger entry 110c-8 (as shown in FIG. 7), evidencing the transfer of value token A from the issuer computer 106 mobile wallet 106a, to the holder A computing device 102 mobile wallet 102a. In some embodiments, the ledger entry may be digitally signed using the private keys of the issuer computer 106 and holder A computing device 102, as parties to the transaction, and using the private key of the payment processor computer 110 to indicate that the transaction has been validated and the entry is legitimate.

In step 512, the payment processor computer 110 may initiate the process of updating the appropriate sub-ledgers. In some embodiments, the payment processor computer 110 may transmit an update to the issuer sub-ledger 106c and the holder A sub-ledger 106a, as the associated computers were involved in the transaction. In some embodiments, the issuer sub-ledger 106c may also be updated with the transaction. In some embodiments, the payment processor computer 110 may send the ledger entry (110c-8 in the master ledger database 110c) indicating that the transfer of value token A from the issuer computer 106 mobile wallet 106a, to the holder A computing device 102 mobile wallet 102a, was performed.

The holder A sub-ledger 102c may include a sub-set of the entries in the master ledger database 110c. For example, in some embodiments, once the transaction to distribute the digital currency from the issuer computer 106 to the holder A computing device 102 has been completed, the holder A sub-ledger 102c may be updated to include the ledger entry evidencing the transaction (e.g., 110c-8). The holder A sub-ledger 102c may include only ledger entries related to transaction related to the holder A computing device 102 as well as to rules governing the digital currency. For example, this may include rules specifying any details regarding the digital currency (e.g., expiration date, transacting value with one or more redeemers).

E. Redemption Using Digital Currency

FIG. 6 shows a flow diagram 600 of a method of a redeemer redeeming digital currency with an issuer of the digital currency according to an embodiment of the present invention.

The redeemer computer 108 may want to redeem digital currency that it received from a holder (e.g., the holder A computing device 102) as part of a transaction process between the holder and redeemer. For example, holder A may have purchased an item from the redeemer in exchange for 400 data elements of the digital currency. The holder A computing device 102 may interact with the redeemer computer 108 to communicate the transfer of 400 data elements.

In some embodiments, the process of transferring data elements between a holder (e.g., holder A) and a redeeming partner may be performed in a manner similar to that described with respect to the transfer of data elements from the issuer computer 110 to the holder A computing device 102. In such embodiments, the holder A computing device 102 may transmit a transaction message to the redeemer computer 108 to transfer data elements (e.g., points) within the digital currency system from the holder A mobile wallet 102a to the redeemer mobile wallet 108a.

As part of the transaction between holder A computing device 102 and the redeemer computer 108, a value token B may be generated. In some embodiments, the payment processor computer 110 may also generate a ledger entry 110c-9 (as shown in FIG. 7) indicating the generation and issuance of value token B. In some embodiments, value token B may be stored in the holder A mobile wallet 102a, and the ledger entry 110c-9 may include data indicating that value token B is stored in the holder A mobile wallet 102a. The master ledger database 110c may also include ledger entries for the transaction between holder A computing device 102 and the redeemer computer 108 (e.g., 110c-10), and the transfer of value token B from the holder A mobile wallet 102a to the mobile wallet 108a of the redeemer computer 108 (e.g., 110c-11).

In step 602, the redeemer computer 108 initiates a redemption transaction to redeem data elements (e.g., points) with the issuer computer 106. In some embodiments, the data elements may be stored as a value token in a mobile wallet 108a associated with the redeemer computer 108. The value token may be transferrable from one mobile wallet to another mobile wallet.

In some embodiments, the redeemer computer 108 may transmit a redemption transaction message to the issuer computer 106 to transfer data elements within the digital currency system from the redeemer mobile wallet 108a to the issuer mobile wallet 108a. In some embodiments, the redeemer computer 108 may generate the redemption transaction message with the source address being an address of the redeemer computer 108, and destination address of the being the address of the issuer computer 106.

In step 604, the redeemer computer 108 and the issuer computer 106 may update their respective mobile wallets (108a and 106a). In some embodiments, the redeemer mobile wallet 108a may be updated to decrease the 400 data elements of digital currency being redeemed with the issuer computer 106, and the issuer mobile wallet 106a may be updated to increase the digital currency by the 400 data elements. In some embodiments, updating the redeemer mobile wallet 108a may also include assigning a value token (e.g., value token B) from the redeemer mobile wallet 108a to the issuer mobile wallet 106a.

In step 606, the payment processor computer 110 may receive a redemption transaction message including details for the transfer or distribution of data elements (e.g., points) from the redeemer computer 108 to the issuer computer 106. The redemption transaction message may be received by the payment processor computer 110 via the communications network 112.

In step 608, the payment processor computer 110 may validate the redemption transaction received in the redemption transaction message. In such embodiments, the payment processor computer 110 may validate the private key of the redeemer computer 108 used to sign the redemption transaction message by using the corresponding public key of the redeemer computer 108. When the request message is validated, the payment processor computer 110 will know that the request message was sent by a legitimate redeemer within the digital currency system.

In some embodiments, the payment processor computer 110 may retrieve a second data entry (e.g., 110c-6 in FIG. 7) from the master ledger database 110c, the second data entry indicating one or more rules associated with the redemption of an amount of data elements. In some embodiments, the data elements may be points having a value defined by the rule. In some embodiments, the second data entry may include one or more rules that may indicate an exchange rate between the value of the data elements and a fiat currency. For example, a rule may indicate that through an agreement between the redeemer computer 108 and the issuer computer 106, the issuer computer will redeem every ten points possessed by the redeemer computer 108 for $1.00. In addition, other rules stored in the master ledger database 110c may limit an amount that the redeemer computer 108 may redeem with the issuer computer 108.

In step 610, the payment processor computer 110 may create a ledger entry in the master ledger database 110c for the redemption transaction received in the redemption transaction message. In some embodiments, the payment processor computer 110 may generate ledger entry 110c-12 (as shown in FIG. 7), evidencing the transfer of value token B from the redeemer computer 108 mobile wallet 108a, to the holder A computing device 106 mobile wallet 106a.

In step 612, the payment processor computer 110 may transmit an update to the issuer sub-ledger 106c and the redeemer sub-ledger 108a, as the associated computers were involved in the transaction. In some embodiments, the payment processor computer 110 may send the ledger entry (110c-12 in the master ledger database 110c) indicating that the transfer of value token B from the holder A computing device 102 mobile wallet 102a, to the issuer computer 106 mobile wallet 106a, was performed.

Subsequently, a settlement process may be initiated between the issuer computer 106 and the redeemer computer 108. The settlement process may be conducted based on the amount of digital currency redeemed by the redeemer computer 108, and one or more rules regarding the digital currency. In such embodiments, the one or more rules may include a rule defining the conversion of the data elements to a fiat currency (e.g., the United States Dollar, British Pound).

For example, the payment processor computer 110 may retrieve financial account information (e.g., account numbers) for the issuer associated with the issuer computer 106 and the redeemer associated with the redeemer computer 108. In some embodiments, the payment processor computer 110, may retrieve the financial account information from the issuer computer 106 and the redeemer computer 108. In other embodiments, the payment processor computer 110 may initiate the settlement process by accessing the profiles database to locate profiles associated with the issuer computer 106 and redeemer computer 108 and retrieving financial information for the issuer and redeemer 108 that may have been received as part of the enrollment process.

In other embodiments, the settlement process can be performed by the issuer sending payment to the redeemer through alternative means (e.g., check payment).

III. Additional Embodiments

In some embodiments, the payment processor computer 110 may be one of a plurality of payment processor computers. In embodiments where there is more than one payment processor computer, each of the payment processor computers may include a master ledger database. When a request message is received by the payment processor computers, one or all of the payment processor computers may create an entry in the master ledger database evidencing the transaction. In such embodiments, each payment processor computer of the plurality of payment processor computers may provisionally add a ledger entry, and a reconciliation process may be performed to synchronize the various master ledger databases to ensure that all of the master ledger database include the same entries. In such embodiments, the payment processor computer may not validate the ledger entry (by digitally signing the ledger entry using the private keys of the plurality of payment processor computers) until there is an agreement between the plurality of payment processor computers as to what the next ledger entry should be. Methods of reconciliation and synchronization between the various master ledger databases may be performed in any suitable manner using one or more algorithms or processes as would be understood by one of ordinary skill in the art.

In some embodiments, the rules messages may be sent and stored out of band of the system. In such embodiments, the rules may not be placed in the master ledger database 110c. Instead, the rules may be stored externally from the system 100 and accessed by the entities in the system 100 when a transaction or redemption process is performed. In addition, in some embodiments where there are no rules defined by the issuer computer 106, default rules stored out of band of the system may be accessed and applied to transactions.

In other embodiments, where the issuer computer 106 provides the digital currency to an issuing partner, the transfer of the digital currency to the issuer partner computer 114 may be performed as described above with respect to FIG. 5. In such embodiments, any ledger entries for rules governing the distribution of the digital currency by the issuing partner computer 114 may be digitally signed using the issuer computer private key 106b and the issuing partner private key 114b. In some embodiments, the ledger entries may also be digitally signed using the redeemer private key 108b.

In some embodiments, the issuer computer 106 may generate digital currency in the form of a coupon value that may be valid and used simultaneously with the data elements (e.g., points) of the digital currency system. In such embodiments, the coupon value may be generated with an expiration date that indicates the coupon value is valid for a predetermined period of time. In some embodiments, the coupon may be an agreement between the issuer computer and the redeemer computer that the issuer will buy-back previously issued data elements at a particular rate. In such embodiments, the coupon may function as a put option, which is an option to sell assets at an agreed price on or before a particular date. For example, issuer A may offer to buy back previously issued data elements at one dollar for every three points if returned prior to Dec. 31, 2016.

IV. Technical Benefits

Embodiments of the present invention provide a number of advantages and technical benefits.

For example, the decentralization of the system such that each entity within the system has the data it needs to conduct transactions in its own unique sub-ledger, significantly reduces the time and computing resources required to perform transactions. Transactions can be conducted between the entities involves in the transaction, with the details of the transaction sent to a central computer once it is completed for the purpose of validation and storage in a master ledger.

This eliminates the need for authorization request messages being sent during a transaction itself and eliminates the friction caused by authentication and authorization processes performed during typical transactions.

Embodiments of the present invention thus eliminate the need for the extensive infrastructure required in current solutions. As the points generation, distribution, and redemption can be handled using messages sent between the parties to the transaction and embodied using a single master ledger and a plurality of sub-ledgers, a single system may be used to managing a plurality of different programs, with the rules for each program embodied in the rules entry in the ledgers.

In addition, unlike typical cryptocurrency systems (e.g., Bitcoin) that require multiple parties to maintain the full block chain (e.g., ledger) of transactions performed since the inception of the system, embodiments of the claimed invention provide for sub-ledgers that optionally allow an entity within the digital currency system to maintain a sub-set of entries stored at the master ledger. The sub-set of entries may include only those relevant to the entity, such as transactions performed by the entity and rules governing the digital currency held by the entity.

In addition, in embodiments of the present invention, each of the entities (e.g., issuer, holder, redeemer) must be authenticated and approved by the payment processing computer, ensuring that only specific entities have the right and ability to generate and transact with the digital currency. In combination with the ability to link the digital currency to a fiat currency, this provides both enhanced security that the digital currency is valid and prevents reduces the risk of fraud involving the digital currency.

V. Example Computer Systems

The various participants and elements described herein may operate one or more computer apparatuses to facilitate the functions described herein. Any of the elements in the figures, including any servers or databases, may use any suitable number of subsystems to facilitate the functions described herein.

Figure 8:
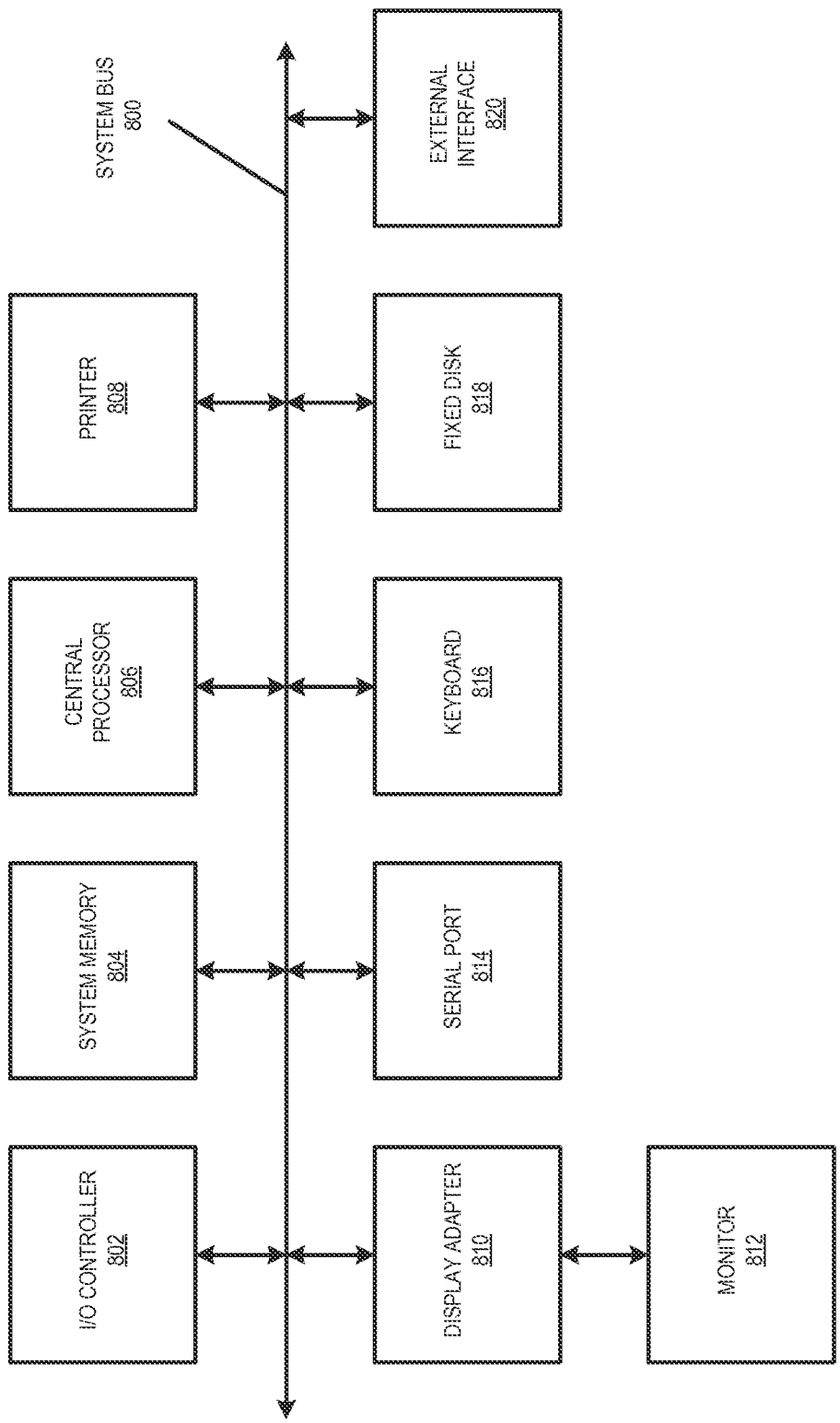
FIG. 8 shows an exemplary block diagram of a computer apparatus according to an embodiment of the present invention.

Examples of such subsystems or components are shown in FIG. 8. Any of the subsystems or components shown in FIG. 8 can be included in any of the previously described devices, apparatuses, or systems. The subsystems shown in FIG. 8 are interconnected via a system bus 800. Additional subsystems such as a printer 808, keyboard 816, fixed disk 818 (or other memory comprising computer readable media), monitor 812, which is coupled to display adapter 810, and others are shown. Peripherals and input/output (I/O) devices, which couple to I/O controller 802 (which can be a processor or other suitable controller), can be connected to the computer system by any number of means known in the art, such as serial port 814. For example, serial port 814 or external interface 820 can be used to connect the computer apparatus to a wide area network such as the Internet, a mouse input device, or a scanner. The interconnection via system bus allows the central processor 806 to communicate with each subsystem and to control the execution of instructions from system memory 804 or the fixed disk 818, as well as the exchange of information between subsystems. The system memory 804 and/or the fixed disk 818 may embody a computer readable medium.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method comprising:
receiving, by a processor computer from a distributor computer, a request message for generating rewards points, the request message comprising a digital signature of the distributor computer and including a first amount of the rewards points to be generated;
validating, by the processor computer, the request message using a key associated with the distributor computer to determine that the distributor computer is authorized to generate the rewards points;
generating, by the processor computer, a first data entry in a master ledger, the first data entry including the first amount of the rewards points, wherein the master ledger is a first blockchain including a plurality of entries;

transmitting, by the processor computer to the distributor computer, a first update to a distributor sub-ledger, the first update including the first data entry, wherein the distributor sub-ledger is a second blockchain including a sub-set of the plurality of entries in the master ledger;

receiving, by the processor computer from the distributor computer, a rules message, the rules message comprising a digital signature of the distributor computer and including a rule governing use of the rewards points, wherein the rule includes an expiration date for the rewards points, an effective date for the rewards points, a limited-time value for the rewards points, a limit on the use of the rewards points, and/or a limit on an entity that can accept the rewards points;

validating, by the processor computer, the rules message using the key associated with the distributor computer;

updating, by the processor computer, the master ledger with a second data entry for the rule, wherein the first amount of the rewards points of the first data entry is associated with the rule of the second data entry;

transmitting, by the processor computer, a second update to the distributor sub-ledger, the second update including the second data entry;

receiving, by the processor computer, a redemption message, the redemption message comprising a digital signature of a redeemer computer including details for a transfer of rewards points from the distributor computer to the redeemer computer;

validating, by the processor computer, the redemption message using a key associated with the redeemer computer;

retrieving, by the processor computer, the second data entry including the rule from the master ledger;

determining, by the processor computer, that the redemption message satisfies the retrieved rule by determining that at least one of the expiration date for the rewards points, the effective date for the rewards points, the limited-time value for the rewards points, the limit on the use of the rewards points, or the limit on the entity that can accept the rewards points is satisfied;

based on determining that the redemption message satisfies the retrieved rule, generating, by the processor computer, a third data entry in the master ledger, the third data entry including a second amount of the rewards points based on the redemption message and the rule; and transmitting, by the processor computer, a third update to the distributor sub-ledger, the third update including the third data entry.

2. The method of claim 1, the method further comprising:
receiving, by the processor computer, a transaction message to transfer a third amount of the rewards points from the distributor computer to a first holder computer, the transaction message comprising a digital signature of the distributor computer and including the third amount of the rewards points to be transferred;

validating, by the processor computer, the transaction message using the key associated with the distributor computer;

generating, by the processor computer, a fourth data entry in the master ledger, the fourth data entry including the third amount of the rewards points transferred to the first holder computer; and transmitting, by the processor computer, a fourth update to the distributor sub-ledger and to a holder sub-ledger, the fourth update including the fourth data entry.

3. The method of claim 2, wherein transferring the third amount of the rewards points from the distributor computer to the first holder computer includes sending a value token representing the third amount to a second storage application of the first holder computer.

4. The method of claim 1, wherein the second data entry includes a digital signature of the distributor computer prior to being appended to the distributor sub-ledger.

5. The method of claim 1, wherein the distributor sub-ledger is a read-only copy of the master ledger.

6. The method of claim 2, wherein the holder sub-ledger comprises a second sub-set of entries of the master ledger.

7. The method of claim 1, wherein the request message is signed using a private key of the distributor computer, and wherein the key associated with the distributor computer is a public key associated with the private key of the distributor computer.

8. The method of claim 7, further comprising:
receiving, by the processor computer from the distributor computer, an update rules message, the update rules message digitally signed using the private key of the distributor computer and including a modification to the rule;

validating, by the processor computer, the update rules message using the public key associated with the distributor computer;

updating, by the processor computer, the master ledger to include a fourth data entry, the fourth data entry including the modification to the rule; and transmitting, by the processor computer, a fourth update to the distributor sub-ledger, the fourth update including the fourth data entry.

9. The method of claim 1, wherein transmitting the first update to the distributor sub-ledger further comprises:
replicating, by the processor computer, the first data entry in the master ledger;
generating, by the processor computer, a hash using the first data entry in the master ledger and a nonce; and
digitally signing, by the processor computer, the first update.

10. The method of claim 1, wherein the first update and the second update are automatically transmitted to the distributor sub-ledger based on a predetermined schedule.

11. A processor computer comprising:
a data processor; and
a non-transitory computer readable medium coupled to the data processor, the non-transitory computer readable medium comprising code, executable by the data processor, to perform the steps of:
receiving, by the processor computer from a distributor computer, a request message for generating rewards points, the request message comprising a digital signature of the distributor computer and including a first amount of the rewards points to be generated,
validating, by the processor computer, the request message using a key associated with the distributor computer to determine that the distributor computer is authorized to generate the rewards points,
generating, by the processor computer, a first data entry in a master ledger, the first data entry including the first amount of the rewards points, wherein the master ledger is a first blockchain including a plurality of entries, transmitting, by the processor computer to the distributor computer, a first update to a distributor sub-ledger, the first update including the first data entry, wherein the distributor sub-ledger is a second blockchain including a sub-set of the plurality of entries in the master ledger, receiving, by the processor computer from the distributor computer, a rules message, the rules message comprising a digital signature of the distributor computer and including a rule governing use of the rewards points, wherein the rule includes an expiration date for the rewards points, an effective date for the rewards points, a limited-time value for the rewards points, a limit on the use of the rewards points, and/or a limit on an entity that can accept the rewards points, validating, by the processor computer, the rules message using the key associated with the distributor computer, updating, by the processor computer, the master ledger with a second data entry for the rule, wherein the first amount of the rewards points of the first data entry is associated with the rule of the second data entry, transmitting, by the processor computer, a second update to the distributor sub-ledger, the second update including the second data entry, receiving, by the processor computer, a redemption message, the redemption message comprising a digital signature of a redeemer computer including details for a transfer of rewards points from the distributor computer to the redeemer computer;

validating, by the processor computer, the redemption message using a key associated with the redeemer computer;

retrieving, by the processor computer, the second data entry including the rule from the master ledger;

determining, by the processor computer, that the redemption message satisfies the retrieved rule by determining that at least one of the expiration date for the rewards points, the effective date for the rewards points, the limited-time value for the rewards points, the limit on the use of the rewards points, or the limit on the entity that can accept the rewards points is satisfied;

based on determining that the redemption message satisfies the retrieved rule, generating, by the processor computer, a third data entry in the master ledger, the third data entry including a second amount of the rewards points based on the redemption message and the rule; and transmitting, by the processor computer, a third update to the distributor sub-ledger, the third update including the third data entry.

12. The processor computer of claim 11, wherein the steps further comprise:

receiving, by the processor computer, a transaction message for transferring a third amount of the reward points from the distributor computer to a first holder computer, the transaction message comprising a digital signature of the distributor computer and including the third amount of the rewards points to be transferred, wherein a first storage application associated with the distributor computer and a second storage application associated with the first holder computer were previously updated to indicate the transfer of the third amount of the rewards points;

validating, by the processor computer, the transaction message using the key associated with the distributor computer;

generating, by the processor computer, a fourth data entry in the master ledger, the fourth data entry including the third amount of the rewards points transferred to the first holder computer; and transmitting, by the processor computer, a fourth update to the distributor sub-ledger and to a holder sub-ledger, the fourth update including the fourth data entry.

13. The processor computer of claim 12, wherein transferring the third amount of the rewards points from the distributor computer to the first holder computer includes sending a value token representing the third amount to the second storage application of the first holder computer.

14. The processor computer of claim 11, wherein the second data entry includes a digital signature of the distributor computer.

15. The processor computer of claim 11, wherein the distributor sub-ledger is a read-only copy of the master ledger.

16. The processor computer of claim 12, wherein the holder sub-ledger comprises a first sub-set of entries of the master ledger.

17. The processor computer of claim 11, wherein the request message is signed using a private key of the distributor computer, and wherein the key associated with the distributor computer is a public key associated with the private key of the distributor computer.

18. The processor computer of claim 11, wherein the steps further comprise:

receiving, by the processor computer from the distributor computer, an update rules message, the update rules message comprising a digital signature of the distributor computer and including a modification to the rule;

validating, by the processor computer, the update rules message using the key associated with the distributor computer;

updating, by the processor computer, the master ledger to include a fourth data entry, the fourth data entry including the modification to the rule; and transmitting, by the processor computer, a fourth update to the distributor sub-ledger, the fourth update including the fourth data entry.

19. The processor computer of claim 11, wherein transmitting the first update to the distributor sub-ledger further comprises:

replicating, by the processor computer, the first data entry in the master ledger;

generating, by the processor computer, a hash using the first data entry in the master ledger and a nonce; and digitally signing, by the processor computer, the first update.

20. The processor computer of claim 11, wherein the first update and the second update are automatically transmitted to the distributor sub-ledger based on a predetermined schedule.

* * * * *